(12) United States Patent
Hayashi et al.

(10) Patent No.: US 7,264,875 B2
(45) Date of Patent: Sep. 4, 2007

(54) MICROCAPSULES AND PROCESSES FOR PRODUCING THE SAME

(75) Inventors: Masaki Hayashi, Okayama (JP); Mitsuru Furomoto, Kakogawa (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 10/800,866

(22) Filed: Mar. 16, 2004

(65) Prior Publication Data

US 2004/0195711 A1 Oct. 7, 2004

(30) Foreign Application Priority Data

Mar. 26, 2003 (JP) .............................. 2003-086233
Dec. 11, 2003 (JP) .............................. 2003-412685

(51) Int. Cl.
*B32B 19/04* (2006.01)
*B32B 23/58* (2006.01)
*B32B 23/18* (2006.01)
*B32B 25/58* (2006.01)

(52) U.S. Cl. ........................... 428/402.21; 428/402.22; 428/403; 427/213.3; 264/4.1; 264/4.3; 264/4.7

(58) Field of Classification Search ................. 430/32; 428/402.21, 402.22, 403; 264/4.1, 4.3, 4.7; 427/213.3

See application file for complete search history.

(56) References Cited

U.S. PATENT DOCUMENTS 6,822,782 B2 * 11/2004 Honeyman et al. ......... 359/296
2005/0168799 A1 * 8/2005 Whitesides et al. ......... 359/296

FOREIGN PATENT DOCUMENTS

| JP | 56-24040 A | 3/1981 |
| JP | 60-216838 A | 10/1985 |
| JP | 61-37975 B2 | 8/1986 |

(Continued)

OTHER PUBLICATIONS

Tamotsu et al., *Microcapsules*, (new edition), with English translation of relevant part thereof (1987).

*Primary Examiner*—Duc Truong
(74) *Attorney, Agent, or Firm*—Birch, Stewart, Kolasch & Birch, LLP

(57) ABSTRACT

A microcapsule encapsulating a disperse system is produced by preparing a liquid organic dispersion containing a resin whose acid group has been neutralized, a colored particle, and an organic solvent; dispersing the liquid organic dispersion in an aqueous medium to produce a capsule particle in the aqueous medium, the capsule particle comprising a disperse system in which the colored particle is dispersed in the organic solvent, and a wall encapsulating the disperse system; and separating the capsule particle from the aqueous medium for dryness. The liquid organic dispersion may comprise, as an organic solvent, a hydrophobic organic solvent and a polar solvent dissolving the resin constituting the wall and being miscible to the aqueous medium. The wall of the capsule particle may be crosslinked or cured with a crosslinking agent. The microcapsule is utilized for an image display device in which the colored particle is electrophoretically movable in the oil phase by a potential difference. The present invention provides a microcapsule encapsulating a core material in which a colored particle is dispersed in an oil phase and having a uniform particle size without an emulsifying and dispersing agent.

12 Claims, 4 Drawing Sheets

FOREIGN PATENT DOCUMENTS

| | | |
|---|---|---|
| JP | 62-57645 A | 3/1987 |
| JP | 62-97638 A | 5/1987 |
| JP | 63-134048 A | 6/1988 |
| JP | 64-86116 A | 3/1989 |
| JP | 05-066600 * | 3/1993 |
| JP | 5-66600 A | 3/1993 |
| JP | 5-27452 B2 | 4/1993 |
| JP | 5-51339 B2 | 8/1993 |
| JP | 5-53538 B2 | 8/1993 |
| JP | 5-53539 B2 | 8/1993 |
| JP | 6-362 A | 1/1994 |
| JP | 6-343852 A | 12/1994 |
| JP | 7-275689 A | 10/1995 |
| JP | 2551783 B2 | 8/1996 |
| JP | 9-290145 A | 11/1997 |
| JP | 2797960 B2 | 7/1998 |
| JP | 11-119264 A | 4/1999 |
| JP | 11-202372 * | 7/1999 |
| JP | 11-202372 A | 7/1999 |
| JP | 3035726 B2 | 2/2000 |
| JP | 2001-503873 A | 3/2001 |
| WO | WO98/19208 A2 | 5/1998 |

* cited by examiner

MICROCAPSULES AND PROCESSES FOR PRODUCING THE SAME

This Non-provisional application claims priority under 35 U.S.C. § 119(a) on Patent Application No(s). 2003-086233 and 2003-412685 filed in Japan on Mar. 26, 2003 and Dec. 11, 2003, respectively, the entire contents of which are hereby incorporated by reference.

FIELD OF THE INVENTION

The present invention relates to microcapsules (or particles encapsulating ink) preferably usable in electrophoretically image-displayable apparatuses (or devices), and to processes for producing the same.

BACKGROUND OF THE INVENTION

Microencapsulation techniques have been widely applied as one of means for enclosing (or sealing) various materials (or core materials) such as a dye, a perfume (or aromatic), a crystalline liquid, an enzyme, a catalyst, and an adhesive. The advantages of such techniques are in that the handling of these core materials can be improved and that the functions of the core materials can be maintained or retained for a long period of time.

On the other hand, display techniques are utilized in a broad range from a displaying method for displaying an image or character information to a visualizing method using a mode in such as a liquid crystal mode, a plasma emission mode, or an EL (electroluminescence) mode. In recent years, as various electronic apparatuses (or devices) are miniaturized due to rapid advance of semiconductor technology, so increase the demand for the miniaturization, weight-saving, lower driving voltage, less electricity to work, and thinner flat panel of display devices. As new display method for responding to these requirements, there are proposed electrophoretically image-displaying devices (or apparatuses) writable on the display surface, which comprises a dispersed system (core material) in which electrophoretic particles (or electrophoretically-movable particles) are dispersed in a disperse medium, microcapsules encapsulating the dispersed system, and being interposing between electrode plates for migrating or moving the electrophoretic particles in the microcapsules between the electrode plates by applying an electric field.

Japanese Patent Application Laid-Open No. 119264/1999 (JP-11-119264A) discloses a display device comprising a disperse system in which charged particles are dispersed into a disperse medium, a number of microcapsules encapsulating the disperse system, and a pair of opposed electrodes which are so disposed as to insert these microcapsules therebetween. In the display device, a display manner is conducted by changing the distribution condition of the charged particles depending on an action of a controlled voltage to change the optical reflexivity. The particle size of the charged particles is about 1/1000 to 1/5 relative to that of the microcapsules, and the dispersivity in the particle size distribution of the charged particles (volume-average particle size/number-average particle size) is 1 to 2. Japanese Patent Application Laid-Open No. 202372/1999 (JP-11-202372A) discloses a display device comprising at least two kinds of charged particles constituting the disperse system and is encapsulated in the microcapsule, and a disperse medium containing a surfactant, wherein the charged particles contain at least one member selected from titanium oxide and carbon black.

Japanese Patent No. 2551783 discloses an electrophoretic display device using microcapsules encapsulating a disperse system, as microcapsules disposed between the electrodes, in which the disperse system comprises a colored disperse medium, and at least one kind of an electrophoretic particle different in optical property from the colored disperse medium. Further, Japanese Patent Application Laid-Open No. 503873/2001 (JP-2001-503873A) discloses an electrophoretically displaying device comprising an arrangement of discrete microscopic containers (or microcapsules); first and second electrodes disposed on and covering opposite sides of the arrangement, at least one of the electrodes being substantially visually transparent; a means for creating a potential difference between the two electrodes; and within each container, a suspension comprising a dielectric fluid and particles exhibiting surface charges in the dielectric fluid, the dielectric fluid and the particles contracting visually, and the potential difference causing the particles to migrate toward one of the electrodes.

In such a microcapsule, the wall of the microcapsule should be dense or closely for encapsulating a liquid as a core material. As a process for producing a microcapsule, physicochemical processes and chemical processes have been known, and these processes are suitably selected and utilized depending on applications of the microcapsule. As the physicochemical processes, a coacervation method using gelatin is well known, and is explained in detail in "Microcapsules (new edition, 1987)" attributed by Kondo Tamotsu et al. (published by Sankyoshuppan Co., Ltd.). Although this method is applied in a wide field, use of gelatin being a natural product causes variation of quality as a membrane material and deteriorates water resistance of the capsule, as a result the application is limited. Moreover, it is impossible to inhibit the formation of a core material-free coacervate particle/drop (as the core material, e.g., a coloring agent dispersed in oil), or the by-production of a capsule enclosing a plurality of core materials. Further, the coacervation method itself is a method for forming a capsule wall and fails to control the particle size of the resulting particles, and the particle size distribution of the particles depends on the dispersiveness of the core material. Therefore, according to the coacervation method, it is difficult to obtain a microcapsule encapsulating a disperse system in which a coloring agent is dispersed in an oil phase, with controlling the particle size and the particle size distribution in high yield.

As the chemical processes, in addition to an in-situ polymerization method (phase-separation method) which comprises allowing a reaction to proceed from a continuous aqueous phase for forming a wall made of an amino resin or others around a core material, there is known an interfacial polymerization in which an aqueous phase comprising a reaction component is reacted with an oil phase comprising another reaction component by polymerization or condensation on the phase boundary for forming a polymeric wall of the microcapsule. In a production process of an encapsulated ink encapsulating a disperse system in which a coloring agent is dispersed in an oil phase, an in-situ polymerization method using an amino resin is particularly utilized [for example, Japanese Patent Publication No. 27452/1993 (JP-5-27452B), Japanese Patent Publication No. 51339/1993 (JP-5-51339B), Japanese Patent Publication No. 53538/1993 (JP-5-53538B), and Japanese Patent Publication No. 53539/1993 (JP-5-53539B)]. However, since a large number of capsule particles without the coloring agent are produced as by-products in the encapsulation process, a step for removing not only by-product particles but also an emulsifying and dispersing agent is essential.

Further, as the same as in the coacervation method, the particle size distribution depends on the dispersiveness of the core material. Moreover, as the interfacial polymerization method, there is known a method for forming a wall of a capsule by polymerizing a polyhydric alcohol existing in a continuous aqueous phase and an isocyanate monomer existing in an oil phase of a core material on the boundary surface [for example, Japanese Patent Application Laid-Open No. 000362/1994 (JP-6-000362A), Japanese Patent Application Laid-Open No. 343852/1994 (JP-6-343852A), Japanese patent Publication No. 37975/1986 (JP-61-37975B), Japanese Patent No. 2797960, and Japanese Patent No. 3035726]. This method has advantages that the formation of particles without a core material is inhibited. However, in the above-mentioned method, unreacted monomers remain in the oil phase and the aqueous phase, and electrophoretic properties of the colored fine particles is deteriorated due to highly polar isocyanate monomers remaining in the oil phase in use as an encapsulated ink for an electrophoretic display devices (or apparatuses). Further, as the same as in the encapsulation method by coacervation or in-situ polymerization, the particle size distribution depends on the dispersiveness of the core material.

Therefore, new microencapsulation techniques have been required for an electrophoretic particle microcapsulating ink, by which production of microcapsule particles without a coloring agent can be inhibited and the particle size can be controllable.

Incidentally, Japanese Patent Application Laid-Open No. 66600/1993 (JP-5-66600A) discloses, as a powdery toner for visualizing an electrostatic latent image, an encapsulated toner encapsulating a coloring agent within an anionic self-water dispersible resin. This document describes a copolymer, as an anionic self-dispersible resin, having 20 to 500 mg equivalent of an acid group (such as carboxyl group) per 10 g of a solid resin. Moreover, the document also discloses a process for production of the toner, which comprises subjecting a mixed composition containing the anionic self-water dispersible resin and a coloring agent to a dispersing treatment, forming a capsulated particle in an aqueous medium by phase inversion emulsification of the mixed composition, and separating the produced capsule particle from the aqueous medium for dryness; and a process for producing a toner which comprises, after the phase inversion emulsification, hydrolyzing the neutralized acid group to form a free acid group. An organic solvent and water which are utilized for the phase inversion are removed from the formed encapsulated toner by drying, and the resultant toner is used for fixation on an object by heat-melting. Therefore, in the encapsulated toner, the coloring agent cannot be moved in the capsule. Moreover, crosslinking of the resin deteriorates the fixing property of the toner.

SUMMARY OF THE INVENTION

It is therefore an object of the present invention to provide a microcapsule encapsulating (or enclosing) a disperse system in which a colored particle is dispersed in an oil phase and having a controlled particle size, and a process for producing the same.

Another object of the present invention is to provide a microcapsule containing in an oil phase, an electrophoretically movable colored particle, having a sharp and uniform particle size independent of a dispersiveness of a core material, reducing the thickness of the wall by enhancing the strength of the wall, and having high transparency (or clearness), and a process for producing the same.

It is still another object of the present invention to provide a microcapsule having high stability and durability and transparency (or clearness) even in the case encapsulating (or enclosing) an oil phase containing an electrophoretically movable colored particle, and a process for producing the same.

It is a further object of the present invention to provide a process for producing a microcapsule certainly with a simple manner and high efficacy by inhibiting the formation of a non-encapsulated particle without an emulsifying or dispersing agent.

The inventors of the present invention made intensive studies to achieve the above objects and finally found that a dispersiveness (emulsification/dispersion or phase inversion emulsification) of a liquid organic dispersion containing a resin, whose acid group has been neutralized with a base, into an aqueous system ensures the formation of a microcapsule (or encapsulated ink) encapsulating (or enclosing) a disperse system (or core material) in which a coloring agent particle is dispersed in an oil phase with controlling the particle size without a dispersion stabilizer in a reliable and extremely simple manner. Further, the inventors also found that the liquid organic dispersion containing a water soluble polar solvent solubilizing the resin can realize a stable dispersion in an aqueous system even in a low neutralization degree of the resin, and an unneutralized acid group of the resin can be utilized for crosslinking. The present invention was accomplished based on the above findings.

That is, the microcapsule of the present invention comprises a disperse system, in which a colored particle is dispersed in an oil phase (or hydrophobic liquid or organic solvent), and a wall encapsulating the disperse system, wherein the wall is formed by a resin having an acid group or a salt thereof (hereinafter, may be simply referred to as an anionic resin or anionic water-dispersible resin). The anionic resin may comprise a polymer having a suitable acid value, for example, in the free acid form, a polymer (or copolymer) having an acid value of 20 to 400 mgKOH/g (e.g., 20 to 120 mgKOH/g). The anionic resin constituting the wall of the capsule may be crosslinked or cured. For example, the resin constituting the wall (or the wall resin) may have a self-crosslinkable group, or a crosslinkable group to a reactive group of the resin, or a crosslinking agent (or a crosslinkable functional group). The disperse system may comprise various oil phases (e.g., an electrically insulating dielectric fluid), and a single kind or plural kinds of colored particle(s) dispersed in the oil phase. The colored particle dispersed in the oil phase is usually charged and movable electrophoretically in the microcapsule by a potential difference or an electromotive force. The mean particle size of the colored particle may be about 10 to 500 nm, and the mean particle size of the microcapsule may be about 1 to 1000 μm. Moreover, the mean thickness of the microcapsule wall may be not more than 2 μm. Such a microcapsule is useful for an electrophoretically image-displayable apparatuses (or devices) by means of electrophoresis. That is, such a microcapsule is usable as a microcapsule (image display device or element) which is interposed between a pair of electrodes, for displaying an image by electrophoresis of a colored particle.

The microcapsule encapsulating the disperse system may for example be produced through a step for preparing a mixture (or liquid organic dispersion) containing an anionic resin whose acid group has been neutralized, a colored particle, and an organic solvent; a step for dispersing the mixture in an aqueous medium (e.g., dispersing by phase inversion emulsification or emulsification/dispersion) to produce a capsule particle in the aqueous medium, the capsule particle comprising a disperse system in which the colored particle is dispersed in the organic solvent, and a wall encapsulating the disperse system; and a step for separating the capsule particle from the aqueous medium for dryness. In the process, the anionic resin constituting the wall may be crosslinked or cured in a suitable step. In the step dispersing at least the liquid organic dispersion in the aqueous medium, the liquid organic dispersion comprising, as an organic solvent, a hydrophobic organic solvent and a polar solvent dissolving the resin constituting the wall and being miscible to the aqueous medium may be dispersed in the aqueous medium. For example, the production process of the microcapsule may comprise a step for neutralizing an acid group of an anionic resin in a polar solvent dissolving a resin constituting a wall and being miscible to an aqueous medium for obtaining a resin-containing organic solvent solution (e.g., a step for neutralizing the acid group with a neutralizing agent sufficient to make the resin water-dispersible); a step for mixing the resin-containing organic solvent solution obtained by the neutralization step with a coloring agent to prepare a liquid organic dispersion; a step for dispersing the liquid organic dispersion in an aqueous medium such as water (e.g., dispersing by phase inversion dispersion with adding the aqueous medium to the liquid organic dispersion, or dispersing by emulsification/dispersion with adding the aqueous medium to the liquid organic dispersion) to produce an aqueous liquid dispersion containing a capsule particle (e.g., a capsule particle in which the coloring agent dispersed in the oil is encapsulated (included) by the anionic resin); a step for crosslinking or curing the wall of the capsule particle in the aqueous medium; and a step for separating the capsule particle from the aqueous medium for dryness. Moreover, the wall of the capsule particle (or the resin constituting the wall of the capsule particle) may be crosslinked or cured with a crosslinking agent (for example, the wall may be crosslinked or cured by preparing an aqueous dispersion containing a capsule particle, and adding a crosslinking agent to the resultant). The resin constituting the wall may be crosslinked or cured with a crosslinking agent, and then the unreacted crosslinking agent may be further crosslinked or cured with a polyfunctional compound.

According to the present invention, since a microcapsule is formed by dispersion [e.g., emulsification (emulsification/dispersion) or phase inversion emulsification] using an anionic resin having an acid group or a salt thereof (e.g., an anionic water-dispersible resin having self-dispersible power in an aqueous medium), the fine particle generation in the aqueous medium and formation of the capsule wall can be substantially simultaneously carried out. Therefore, a microcapsule can be produced efficiently by a simple manner without not only a special apparatus but also a dispersion stabilizer. Moreover, the particle characteristics such as the particle size of the microcapsule may be controlled precisely by adjusting properties of the anionic resin (e.g., self-dispersible power of an anionic water-dispersible resin).

Incidentally, in this specification the phrase "anionic resin" and "anionic water-dispersible resin" mean a resin having an acid group or a salt thereof. The resin, in the free form, may be non-soluble (or insoluble) in water, and is soluble or dispersible in water (in other words, at least water dispersible) by neutralizing at least a part of acid group with a base. That is, "anionic resin" and "anionic water-dispersible resin" can be subjected to neutralization of at least part of acid group with a base and can be contained (or dissolved) in an organic phase (or organic solvent phase), and the organic continuous phase containing the resin can be converted into a continuous phase of an aqueous medium (or water-continuous phase). Moreover, the term "acid group" may mean the same as the term "acidic group". Further, the phrase "colored particle" may use as the same meaning as the phrase "coloring agent". Furthermore, The phrase "(meth)acrylic monomer" is a general name for an acrylic monomer and a methacrylic monomer.

DETAILED DESCRIPTION OF THE INVENTION

[Microcapsule]

Figure 1:
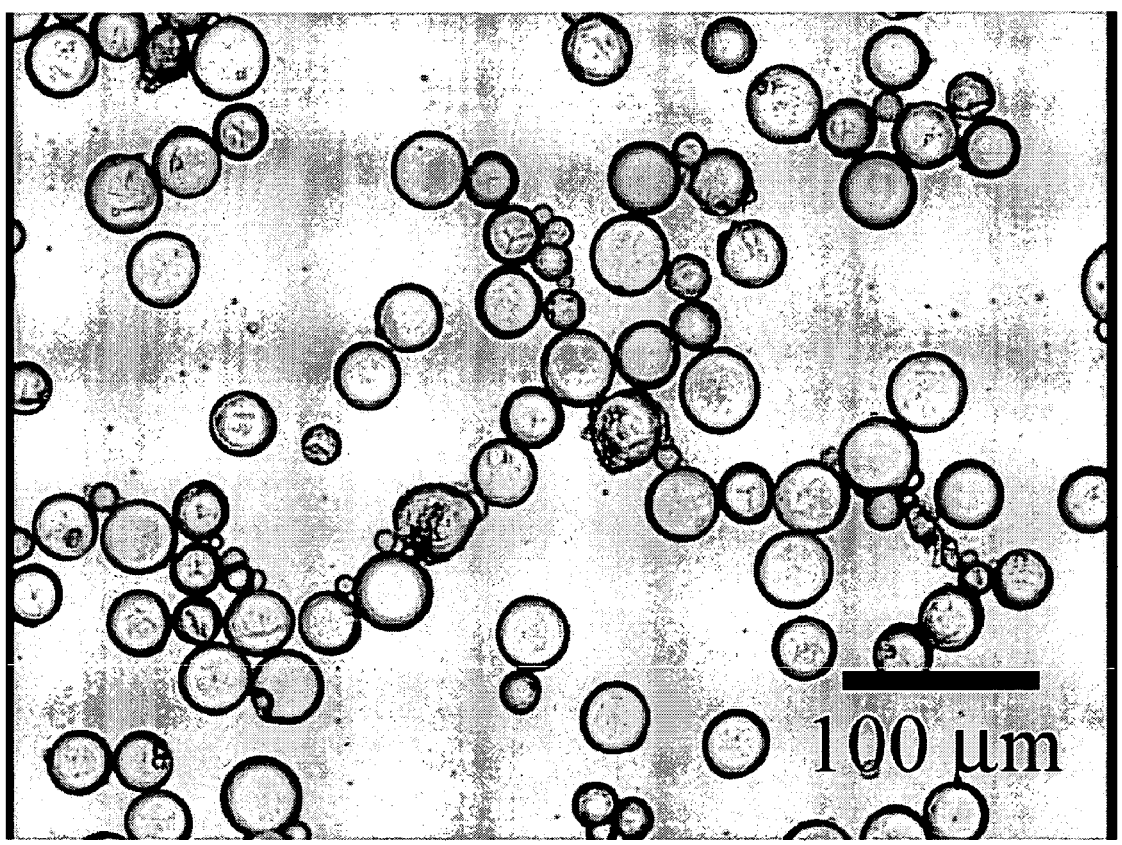
FIG. 1 shows an optical microphotograph of the liquid capsule dispersion (without both titanium oxide and a pigment-dispersing agent) obtained in Example 5.

The microcapsule of the present invention comprises a disperse system (or oil phase-disperse system) in which a colored particle is dispersed in an oil phase, and a wall (or shell) which encapsulates (or encloses) the disperse system and is formed with a resin (anionic resin) having an acid group or a salt thereof. The anionic resin (or self-water dispersible resin) has an acid group to impart hydrophilicity to the resin. When the acid group is neutralized with a base, an anion is formed in a water medium thereby expressing hydrophilicity. The typical acid group includes, for example, a carboxyl group, an acid anhydride group, a phosphoric acid group, a sulfonic acid group, a sulfuric acid group, and others. The acid groups may be used singly or in combination of not less than two groups in order to introduce into a resin. The acid group is usually a carboxyl group or an acid anhydride group, or a sulfonic acid group in practical usage.

The anionic resin has an acid group, and an organic continuous phase containing the resin subjected to neutralization treatment is mixed with an aqueous medium (such as water) to form dispersion [dispersion by emulsification/dispersion or phase inversion (or phase inversion emulsification)], and the organic phase forms, in the aqueous continuous phase, a discontinuous phase (or organic droplet phase). Such a resin may be a condensation-series resin containing the acid group (e.g., a carboxyl group and/or a sulfonic acid group) at a given concentration [for example, a polyester-series resin (e.g., an aliphatic polyester-series resin, an aromatic polyester-series resin, a polyester-series elastomer), a polyamide-series resin, a polyurethane-series resin], or may be a polymerization-series resin (for example, an olefinic resin, a styrenic resin, a (meth)acrylic resin).

The typical resin having an acid group may be obtained by polymerization of a polymerizable monomer having at least an acid group (or acidic polymerizable monomer), and may be usually obtained by copolymerization of an acidic polymerizable monomer and a polymerizable monomer (or acid group-free polymerizable monomer) which is copolymerizable to the acidic polymerizable monomer. If necessary, a monomer containing a crosslinkable functional group other than an acid group may be further copolymerized.

The typical examples of the acid group-containing polymerizable monomer include a polymerizable carboxylic acid [e.g., a polymerizable monocarboxylic acid such as (meth) acrylic acid, and crotonic acid; a partial ester of a polymerizable polycarboxylic acid, such as a mono$C_{1-10}$alkyl ester of itaconic acid (e.g., monobutyl itaconate), and a mono$C_{1-10}$alkyl ester of maleic acid (e.g., monobutyl maleate); a polymerizable polycarboxylic acid such as itaconic acid, maleic acid and fumaric acid; an acid anhydride corresponding to the polymerizable polycarboxylic acid, such as maleic anhydride], a phosphoric acid group-containing monomer or an acid phosphoxyalkyl(meth)acrylate [for example, a phosphoxy$C_{2-6}$alkyl(meth)acrylate such as 2-phosphoxyethyl (meth)acrylate, and 4-phosphoxybutyl(meth)acrylate; an acid phosphoxy$C_{2-6}$alkyl(meth)acrylate such as phosphoxy acid phosphoxyethyl(meth)acrylate, and acid phosphoxypropyl(meth)acrylate], a sulfonic acid group-containing polymerizable monomer [for example, 3-chloro-2-acrylamide-2-methylpropanesulfonic acid, styrenesulfonic acid], a sulfoalkyl(meth)acrylate [for example, a sulfo$C_{2-6}$alkyl (meth)acrylate such as 2-sulfoethyl(meth)acrylate], and others. These acid group-containing polymerizable monomers may be used singly or in combination. The preferred polymerizable monomer includes a polymerizable monomer having a carboxyl group, an acid anhydride group, or a sulfonic acid group. As the acid group-containing polymerizable monomer, (meth)acrylic acid is practically used.

The amount of the acid group-containing polymerizable monomer may be selected from such a range that a droplet can be formed by dispersing a resin-containing organic phase in an aqueous continuous phase with phase inversion emulsification or emulsification/dispersion, for example, a range that a given acid value described below can be imparted to the resin. The amount of the acid group-containing polymerizable monomer may be usually about 3 to 80 mol %, preferably about 5 to 70 mol % (e.g., 10 to 60 mol %), and more preferably about 15 to 50 mol % (e.g., 20 to 40 mol %) relative to the total monomers. Moreover, the amount of the acid group-containing polymerizable monomer may be usually about 3 to 20 mol %, preferably about 4 to 15 mol % (e.g., 5 to 15 mol %), and more preferably about 5 to 12 mol % (e.g., 5 to 10 mol %) relative to the total monomers.

The copolymerizable monomer includes, for example, a styrenic monomer (or aromatic vinyl monomer) [e.g., styrene, vinyltoluene such as 2-methylstyrene, vinylxylene, t-butylstyrene, and chlorostyrene], an alkyl ester of (meth) acrylic acid [e.g., a $C_{1-18}$alkyl (meth)acrylate having a linear or branched alkyl group, such as methyl (meth)acrylate, ethyl (meth)acrylate, isopropyl (meth)acrylate, n-butyl (meth)acrylate, isobutyl (meth)acrylate, t-butyl (meth)acrylate, n-hexyl (meth)acrylate, n-octyl (meth)acrylate, n-amyl (meth)acrylate, isoamyl (meth)acrylate, n-hexyl (meth)acrylate, 2-ethylhexyl (meth)acrylate, n-octyl (meth)acrylate, decyl (meth)acrylate, and dodecyl (meth)acrylate], a vinyl ester or a vinyl ester of an organic acid [e.g., a vinyl ester of a linear or branched $C_{2-20}$alipatic carboxylic acid, such as vinyl acetate, vinyl propionate, and vinyl versatate; a vinyl ester of an aromatic carboxylic acid, such as vinyl benzoate], a polymerizable nitrile or a vinylcyanide [e.g., (meth)acrylonitrile], an olefin [e.g., α-$C_{2-10}$olefin such as ethylene, propylene, and 1-butene], a halogen-containing monomer [e.g., a chlorine-containing monomer (such as vinyl chloride and vinylidene chloride), a fluorine-containing vinyl monomer (such as vinyl fluoride, vinylidene fluoride, tetrafluoroethylene, hexafluoropropylene, chlorotrifluoroethylene, and a (meth)acrylate having a fluorine-containing alkyl group)], a monomer having ultraviolet absorbability or antioxidant property [e.g., a polymerizable monomer having a benzotriazole ring, such as 2-(2'-hydroxy-5-(meth)acryloyloxyethylphenyl)-2H-benzotriazole; a polymerizable monomer having a benzophenone backbone, such as 2-hydroxy-4-(2-(meth)acryloyloxyethoxy)benzophenone; a polymerizable monomer having 2,2,6,6-tetramethylpiperidyl group, such as 1,2,2,6,6-pentamethyl-4-piperidyl (meth)acrylate], a nitrogen-containing monomer [e.g., N-vinylpyrrolidone, diacetone acrylamide], a macromonomer having one polymerizable unsaturated group in one terminal (or end) of the molecular, and others. These copolymerizable monomers may be used singly or in combination.

Among these copolymerizable monomer, a styrenic monomer (particularly styrene), and an alkyl ester of (meth) acrylic acid [in particular a $C_{1-12}$alkyl acrylate, a $C_{1-4}$alkyl methacrylate (e.g., methyl methacrylate)] are usually employed. Thus obtained polymer may be a styrene-(meth) acrylate-(meth)acrylic acid-series copolymer.

The preferred anionic resin usually has a functional group participating in crosslinking or curing (a self-crosslinkable group, or a crosslinkable functional group to a reactive group of a resin, or a crosslinking agent). Such an anionic resin may be obtained by copolymerization of a polymerizable monomer having a functional group (self-crosslinkable group and/or crosslinkable functional group) with the polymerizable monomer having the acid group and/or the copolymerizable monomer. Moreover, the acid group of the anionic resin may be utilized as a crosslinkable functional group, and such an anionic resin may be obtained by polymerization of the polymerizable monomer having the acid group, and optionally the copolymerizable monomer.

As the polymerizable monomer having a self-crosslinkable group, there may be mentioned a polymerizable monomer having a methylol group or an N-alkoxymethyl group [e.g., N-methylol(meth)acrylamide, and an N-alkoxymethyl (meth)acrylamide such as N-butoxymethyl(meth)acrylamide], a polymerizable monomer having a silyl group or an alkoxysilyl group [e.g., a $C_{1-2}$alkoxyvinylsilane such as dimethoxymethylvinylsilane, or trimethoxyvinylsilane; a (meth)acryloyloxyalkyl$C_{1-2}$alkoxysilane such as 2-(meth) acryloyloxyethyldimethoxymethylsilane, 2-(meth)acryloyloxypropyldimethoxymethylsilane, 2-(meth)acryloyloxyethyltrimethoxysilane, and 2-(meth) acryloyloxypropyltrimethoxysilane], and others.

Moreover, the crosslinkable functional group may be introduced into a resin by copolymerization of a polymerizable monomer having a functional group forming a crosslinking system in relation to the species of the functional group introduced into the resin and/or the crosslinking agent to be used. Examples of the functional group constituting the crosslinking system include a reactive group with respect to a carboxyl group or acid anhydride group (e.g., an epoxy group or glycidyl group, a hydroxyl group, a methylol group, and an N-alkoxymethyl group), a reactive group with respect to a hydroxyl group (e.g., a carboxyl group or acid anhydride group, an isocyanate group, a methylol group or N-alkoxymethyl group, a silyl group and alkoxysilyl group), and others. The crosslinkable functional group may be composed of a carboxyl group, an acid anhydride group, a hydroxyl group, and/or a glycidyl group.

Regarding the crosslinking system-formable monomer, a polymerizable monomer having a carboxyl group or an acid anhydride group, and a polymerizable monomer having a methylol group, an N-alkoxymethyl group, a silyl group or an alkoxysilyl group are the same as mentioned above. As the polymerizable monomer containing an epoxy group or a glycidyl group, there may be exemplified glycidyl(meth) acrylate, allylglycidyl ether, and others. The polymerizable monomer containing a hydroxyl group includes an alkylene glycol mono(meth)acrylate [e.g., 2-hydroxyethyl(meth) acrylate, 2-hydroxypropyl(meth)acrylate, 4-hydroxybutyl (meth)acrylate, hexanediol mono(meth)acrylate], a (meth) acrylic monomer added thereto a lactone [e.g., "PLACCEL FM-2]" and "PLACCEL FA-2", each manufactured by Daicel Chemical Industries, Ltd.], a hydroxyl group-containing (meth)acrylate [e.g., a (poly)oxyalkylene glycol mono(meth)acrylate such as diethylene glycol mono(meth) acrylate, polyethylene glycol mono(meth)acrylate, and polypropylene glycol mono(meth)acrylate], hydroxyethyl vinyl ether, hydroxybutyl vinyl ether, and others. The polymerizable monomer having an isocyanate group includes, for example, vinylphenylisocyanate.

The amount of the polymerizable monomer having a self-crosslinkable group or a crosslinkable functional group may be selected depending on the resin property, and may for example be about 1 to 30 mol % (e.g., 3 to 30 mol %), preferably about 4 to 25 mol %, and more preferably about 5 to 20 mol % relative to the total monomers.

The polymerization of the polymerizable monomer may be conducted by a conventional method, for example, a thermal polymerization, a solution polymerization, or a suspension polymerization, and is usually carried out by a solution polymerization which comprises polymerizing a monomer in a reaction solvent (organic solvent) in practical cases. The reaction solvent includes an inert solvent, for example, an aromatic hydrocarbon such as toluene, xylene, and benzene; an alicyclic hydrocarbon such as cyclohexane; an aliphatic hydrocarbon such as hexane; an alcohol such as methanol, ethanol, (iso)propanol, and butanol; a ketone such as acetone, methyl ethyl ketone, and methyl isobutyl ketone; an ester such as ethyl acetate, and butyl acetate; an ether alcohol such as cellosolve, and carbitol; an ether ester such as butyl cellosolve acetate; and others. These solvents may be used singly or in combination as a mixed solvent. In the preferred embodiment, a readily removable solvent, e.g., a solvent having a low boiling point (for example, a solvent having a boiling point of about 70 to 120° C.) such as 2-propanol, acetone, methyl ethyl ketone, or ethyl acetate is used.

The polymerization of the polymerizable monomer may be conducted in the presence of a polymerization initiator. As the polymerization initiator, there may be exemplified a peroxide (e.g., a diacyl peroxide such as benzoyl peroxide and lauroyl peroxide, a dialkyl peroxide such as di-t-butyl peroxide and dicumyl peroxide, an alkyl hydroperoxide such as t-butyl hydroperoxide and cumene hydroperoxide, methyl ethyl ketone peroxide, and t-butyl peroxy-2-ethylhexanoate), an azo-series compound (e.g., azobisisobutyronitrile, and azobisisovaleronitrile), a persulfate salt, hydrogen peroxide, and others. The polymerization may be usually carried out at a temperature of about 50 to 150° C. under an inert atmosphere.

The molecular weight of the anionic resin may be selected from a range which does not deteriorate mechanical properties of the resin as a capsule wall. The number average molecular weight of the resin may be usually selected within a range from about $0.3 \times 10^4$ to $10 \times 10^4$, and preferably about $0.5 \times 10^4$ to $7 \times 10^4$ (e.g., about $1 \times 10^4$ to $5 \times 10^4$). The smaller the molecular weight of the resin tends to deteriorate the properties (e.g., mechanical property) of a capsule wall. The larger the molecular weight thereof has a possibility to deteriorate dispersibility (e.g., emulsification/dispersion property, property for phase inversion emulsification) due to increase of the viscosity, or to decrease controllability of the particle size and sharpness of the particle diameter distribution (or particle size distribution).

Incidentally, the molecular weight of the water-dispersible resin may be adjusted by the species and amount of the polymerization initiator, the polymerization temperature, the species and amount of the organic solvent to be used, and other factors. Moreover, the molecular weight may be also controlled by using a polyfunctional radical-polymerizable monomer (e.g., divinylbenzene, ethylene glycol di(meth) acrylate), a polyfunctional polymerization initiator (such as a polymerization initiator having a plurality of peroxy groups or a plurality of azo groups), a chain transfer agent, or others.

From the viewpoint of preventing the microcapsule from adhesion in the drying process or blocking under a high temperature, as well as the properties as a material for the electrophoretic display device, the resin preferably has high transparency, and is in a solid form at an ambient temperature at which the microcapsule is used, for example, at a temperature of not higher than 50° C. (e.g., a room temperature such as about 10 to 30° C.).

The concentration of the acid group of the water-dispersible resin may be selected from a range that a stable capsule particle can be formed by neutralizing at least part (part or all) of the acid group with a base and dispersing the dispersed system into an aqueous medium with use of phase inversion emulsification or emulsification/dispersion. When the acid group is in a free form, the acid value of the resin may for example be about 20 to 400 mgKOH/g, preferably about 30 to 400 mgKOH/g (e.g., about 30 to 300 mgKOH/ g), more preferably about 50 to 400 mgKOH/g (e.g., about 100 to 300 mgKOH/g), and particularly about 150 to 400 mgKOH/g. Moreover, the acid value of the resin may for example be about 20 to 120 mgKOH/g, preferably about 20 to 100 mgKOH/g (e.g., about 30 to 100 mgKOH/g), and more preferably about 20 to 70 mgKOH/g. The acid value means an amount (mg) of KOH necessary to neutralize 1 g of the resin (solid bases). If the acid value is too small, it is difficult to improve dispersibility of the dispersed system (disperse by phase inversion emulsification or emulsification/dispersion) and the formation of a capsule particle even when not less than 100 mol % of the acid group is neutralized with a base. On the other hand, the larger the acid value deteriorates the formation of stable particles in an aqueous medium.

In order to inhibit volatilization or exudation of the oil phase (organic phase or organic solvent phase) as the core material, the anionic resin preferably has a barrier property relative to the oil phase of the core material (for example, a resin being insoluble relative to the oil phase or non-erodible by the oil phase). From such a viewpoint, the anionic resin constituting the wall is preferably crosslinked or cured.

The glass transition temperature (Tg) of the anionic resin may for example be selected a range within about −25 to 200° C. (e.g., about −25 to 150° C.), preferably about 0 to 150° C. (e.g., about 0 to 120° C.), and more preferably about 25 to 150° C. (particularly about 25 to 120° C.), depending on the ambient temperature of the microcapsule. The glass transition temperature of the anionic resin may be also about 50 to 120° C. (e.g., about 70 to 100° C.).

The disperse system (core material) encapsulated in the microcapsule of the present invention comprises an oil phase (organic solvent phase or disperse medium), and a colored particle dispersed in the oil phase. The colored particle in the oil phase is usually charged with electricity, and can be migrated or movable electrophoretically in the microcapsule by a potential difference. The oil phase is a liquid form at an ambient temperature at which the microcapsule is used (e.g., a room temperature such as about 10 to 30° C.), and the oil phase may usually comprise a hydrophobic liquid (hydrophobic organic solvent), in particular an electrically insulating dielectric fluid (e.g., a solvent having a volume resistivity of not less than $10^{10}$ Ω and a dielectric constant of not less than 2.5).

As the disperse medium (or organic solvent phase) of the core material, there may be exemplified an electric insulative solvent having high electric resistance, for example, a hydrocarbon [e.g., an aromatic hydrocarbon such as benzene, toluene, or naphthene; an alicyclic hydrocarbon such as cyclohexane; an aliphatic hydrocarbon such as hexane, kerosene, a linear or branched paraffinic hydrocarbon, or "ISOPAR" (trade name, manufactured by EXXON CHEMICAL); an alkylnaphthalene], a diphenyl-diphenyl ether mixture, a halogen-containing solvent [for example, a halogenated hydrocarbon (e.g., carbon tetrachloride), a fluorine-containing solvent (e.g., a chlorofluorocarbon such as CHFC-123 or HCFC-141b; a fluoroalcohol; a fluorine-containing ether such as a fluoroether; a fluorine-containing ester such as a fluoroester; a fluoroketone)], and a silicone oil [a silicone oil such as poly(dimethylsiloxane)]. These solvents may be used singly or in combination.

The organic disperse medium of the core material has a higher boiling point than an organic solvent (for example, a reaction solvent to be used for polymerization of a polymerizable monomer) of a resin solution (or liquid resin composition) to be subjected to phase inversion emulsification or emulsification/dispersion, and is advantageously selected from a high-boiling organic solvent which can remain as the disperse medium for the coloring agent in the capsules even after removing the solvent from the resin solution.

As the colored particle of the disperse system (coloring agent or a movable colored particle), various colored particles (achromatic or chromatic particles) may be utilized, and may be, for example, a particle different in optical properties from the disperse medium, a particle causing visual contrast by electrophoresis, a particle formable a visually recognizable pattern in the visible region directly or indirectly, and other particles. For example, there may be mentioned a colored particle such as an inorganic pigment (e.g., a black pigment such as carbon black, a white pigment such as titanium dioxide, zinc oxide or zinc sulfide, a red pigment such as iron oxide, a yellow pigment such as yellow iron oxide (FeO(OH)) or cadmium yellow, and a blue pigment such as Berlin blue (or iron blue) or ultramarine blue), an organic pigment (e.g., a yellow pigment such as pigment yellow or Diarylide yellow, an orange pigment such as pigment orange, a red pigment such as pigment red, lake red or pigment violet, a blue pigment such as copper phthalocyanine blue or pigment blue, and a green pigment such as copper phthalocyanine green), a resin particle colored with a coloring agent (e.g., a dye, and a pigment including the above pigment). These colored particles may be used singly or in combination. That is, in the disperse system, single (i.e., the same kind (or class) or the same category or series particle) colored particles may be dispersed in the disperse medium (e.g., an electrically insulating dielectric fluid), or a plurality of colored particles (or colored particles having different colors) may be dispersed in the disperse medium.

The mean particle size or particle diameter of the colored particle (coloring agent) may be selected from a range of about 0.01 to 1 μm, and may be on the nanometer length scale (e.g., about 10 to 500 nm, preferably about 20 to 300 nm, (e.g., about 20 to 200 nm), and more preferably about 20 to 150 nm). The colored particle (coloring agent) may have a particle size in a nanometer order (e.g., about 20 to 100 nm) which is transparent to visible light. The particle size distribution of the colored particle (coloring agent) is not particularly limited, and a colored particle having narrow particle size distribution (e.g., monodisperse particle) is preferred.

The content of the colored particle in the core material is in such a range that electrophoretical movability is not adversely affected, and the content may for example be about 1 to 50% by weight (e.g., about 1 to 30% by weight), preferably about 1 to 20% by weight (e.g., about 1 to 15% by weight), and more preferably about 1 to 10% by weight (e.g., about 1 to 5% by weight).

Incidentally, the disperse medium may be colored with various dyes (e.g., an oil soluble dye such as an anthraquinone or an azo compound) as far as the disperse medium produces the contrast in relation to the colored particle. For example, the disperse medium may be colored with a different color from the colored particle.

In order to inhibit aggregation of the colored particle (or movable particle) and improve dispersion stability, the disperse system may comprise, as well as a viscosity controller, various components for controlling the polarity or surface charge amount of the colored particle, for example, a surface-treating agent (e.g., a resin having a polar group) for coating or covering on the surface of the colored particle or adhering or bonding to the surface thereof, a dispersing agent (e.g., a dispersion stabilizer, a surfactant), a charge-controlling agent, and others.

The microcapsule is usually in a spherical form (including a fine spherical form, microsphere). The mean particle size of the microcapsule may be selected from a range of about 1 to 1000 μm. The mean particle size of the microcapsule may be usually about 1 to 200 μm, preferably about 1 to 100 μm, and more preferably about 1 to 60 μm (e.g., about 1 to 50 μm), and may further be about 5 to 50 μm. The particle size distribution of the microcapsule is not particularly limited to a specific one, and usually, the microcapsule is preferably a capsule showing normal distribution and having narrow particle size distribution (for example, monodisperse capsule). Incidentally, the microcapsule usually has a high light-transmittance, and may for example have a visible light transmittance of not less than 80%.

Moreover, the mean thickness of the microcapsule wall may be not more than 2 μm (e.g., about 10 nm to 2 μm), and may be usually not more than 1 μm (e.g., about 30 to 900 nm), preferably not more than 800 nm (e.g., about 50 to 800 nm), and more preferably not more than 700 nm (e.g., about 80 to 700 nm).

The microcapsule is useful for displaying an image (such as a character or a pattern) by interposing the microcapsule between a pair of electrodes (e.g., a pair of electrodes in which at least the electrode of the display side comprises a transparent electrode) constituting a display device, and electrophoretically moving the colored particle in the microcapsule by applying a voltage to the electrodes (electromotive force). The pair of electrodes of the image display may be changed or alternated in polarity in order to control a moving direction of the colored particle.

For example, in the case using a microcapsule encapsulating a disperse system (core material) which comprises a colored disperse medium and a dispersed colored particle producing a contrast with respect to the disperse medium (e.g., a particle different in optical properties from the disperse medium, or a colored particle different in color from the disperse medium), the microcapsule shows or exhibits the color of the disperse medium in a normal condition (or state), and displays a pattern caused by the colored particle by electrophoretically moving the colored particle toward the display surface side in response of an action of an electric field. For instance, use of a disperse system comprising a disperse medium colored with a black dye and a white particle dispersed therein can display or exhibit a white pattern in accordance with electrophoretic movement of the white particle. Moreover, when a disperse system comprising a disperse medium colored with a yellow dye and a blue particle dispersed in the colored medium, a blue pattern can be displayed by electrophoretic movement of the blue particle.

Moreover, a microcapsule encapsulating (or including) a disperse system (core material) in which a single colored particle (e.g., a white particle, a black particle) is dispersed in a disperse medium can display an image pattern be displayed on a display surface by electrophoresis of the colored particle. Moreover, a color pattern can be displayed or exhibited by optionally using a color filter in combination with the colored particle.

Further, a microcapsule encapsulating a disperse system (core material) in which a yellow particle (particularly, a particle having a nanometer size) is dispersed in a medium (a yellow microcapsule), a microcapsule encapsulating a disperse system (core material) in which a red particle (particularly, a particle having a nanometer size) is dispersed in a medium (a red microcapsule), a microcapsule encapsulating a disperse system (core material) in which a blue particle (particularly, a particle having a nanometer size) is dispersed in a medium (a blue microcapsule), and optionally a microcapsule encapsulating a disperse system (core material) in which a black particle (particularly, a particle having a nanometer size) is dispersed in a medium (a black microcapsule) are prepared. Each of the colored microcapsules is interposed between a pair of electrode, in the form of a layer structure, and a full-color pattern can be displayed or exhibited in response to controlling the voltage applied to each electrode or the polarity of the electrodes, by utilizing a subtractive mixture. Incidentally, if necessary, a color filter may be interposed between layers.

Furthermore, each pixel comprises an action of an electric field to each pixel which comprises a yellow pixel comprising a yellow microcapsule, a red pixel comprising a red microcapsule, and a blue pixel comprising a blue microcapsule ensures display of a full-color image. Incidentally, if necessary, a black pixel comprising a black microcapsule or a white pixel comprising a white microcapsule may be disposed between the electrodes.

Moreover, when a plurality of colored particles (or disperse system) which are charged with different electricity (+or −) from each other in the disperse medium are utilized, the movement of the plurality of colored particles in the reverse direction from each other can be realized by applying a voltage between opposed (faced) electrodes, and the movable direction of the plurality of colored particles can be controlled by switching (or controlling) the polarity of the applied voltage. For example, in the case using a microcapsule in which negatively charged titanium oxide and positively charged carbon black are dispersed in the disperse medium, a bright-colored image (faded color pattern) with titanium oxide can be formed by charging the polarity of the electrodes of the display surface side positive, and also, a black image with carbon black can be formed by charging the polarity of the electrodes of the display surface side negative.

[Process for Producing Microcapsule]

According to the present invention, the microcapsule encapsulating (or enclosing) the disperse system may be produced by the steps of: a step (or a preparation step of a liquid organic dispersion) for preparing a mixture containing an anionic resin whose acid group is neutralized, a colored particle, and an organic solvent; a step (or a capsule production step, or a dispersion step (a phase inversion emulsification step, an emulsification/dispersion step)) for dispersing (dispersing by phase inversion emulsification, emulsification/dispersion, or others) the mixture in an aqueous medium to form a capsule particle in an aqueous medium, wherein the capsule particle comprises a disperse system (core material) in which the colored particle is dispersed in the organic medium, and a wall encapsulating (or enclosing) the disperse system; and a step (a drying step) for separating the capsule particle from the aqueous medium to dry the capsule particle.

Moreover, after production of the capsule particle, a step (a crosslinking or curing step) for crosslinking or curing the anionic resin constituting the wall may be conducted in a suitable stage (e.g., the drying step). The crosslinking or curing step is usually carried out after the capsule production step (e.g., a dispersion step such as a phase inversion emulsification step, and an emulsification/dispersion step) in the form of the dispersion (slurry) in which the capsule particle is dispersed in the aqueous medium in practical cases.

The step for preparing the liquid organic dispersion may be carried out by various methods as far as the mixture comprises an anionic resin whose acid group has been neutralized, a colored particle, and an organic solvent. The method may include, for example, (1) a method which comprises mixing an organic solvent solution containing an anionic resin whose acid group is neutralized, and a colored particle with dispersing to prepare a liquid dispersion containing the colored particle; (2) a method which comprises subjecting a mixture containing an anionic resin, a colored particle and an organic solvent to a mixing and dispersing treatment, and neutralizing the acid group of the resin; (3) a method which comprises mixing a liquid dispersion in which a colored particle is dispersed in an organic solvent (coloring agent-dispersion or coloring agent dispersed in oil phase) and an anionic resin having a neutralized acid group or the resin-containing organic solvent solution; and others. Incidentally, regarding the method (1), it is advantageous in view of the production steps that the dispersion of the colored particle is prepared by passing through a neutralization step for neutralizing the acid group of the anionic resin in the organic solvent (e.g., a polar solvent dissolving the resin constituting the wall and being miscible with an aqueous medium), and a dispersion step for mixing and dispersing the resin-containing liquid organic solvent obtained by the neutralization step and a coloring agent. The neutralization step may for example be conducted by preparing an anionic resin in the presence of the organic solvent, and neutralizing the acid group of the resin in the mixture.

In the step for preparing the liquid organic dispersion, the water-dispersible resin may be prepared by the above-mentioned method, particularly a solution polymerization. The solid (or resin) concentration of the resin solution (e.g., a resin solution obtained by the solution polymerization) containing the resin and the organic solvent (the polar solvent) may for example be about 20 to 80% by weight (e.g., about 30 to 70% by weight).

In the neutralization step for neutralizing the water-dispersible resin, various bases may be used, and includes for example an inorganic base [e.g., ammonia, and an alkali metal hydroxide such as sodium hydroxide or potassium hydroxide], an organic base [e.g., an alkylamine such as trimethylamine, triethylamine or tributylamine (particularly a trialkylamine), an alkanolamine such as dimethylethanolamine, ethanolamine or diethanolamine, and a heterocyclic amine such as morpholine]. These bases may be used singly or in combination.

The neutralization degree for the acid group of the resin may be selected from a range that the resin converts to at least water dispersible one and forms a capsule particle by phase inversion emulsification or emulsification/dispersion, and is, for example, a wide range from about 5 to 100 mol % (e.g., about 10 to 100 mol %), in particular about 10 to 75 mol %. The neutralization degree may be usually about 5 to 60 mol % (e.g., about 10 to 60 mol %), preferably about 5 to 50 mol % (e.g., about 10 to 50 mol %), and more preferably about 5 to 40 mol % (e.g., about 10 to 40 mol %). The resin may be water-soluble by a neutralization treatment. When the amount of the acid group introduced into the resin and/or the neutralization degree of the acid group of the resin is controlled, the particle size of the capsule particle can be controlled with preparing the capsule particle having a normal distribution in the particle size.

Moreover, in the above-mentioned method, the colored particle (or coloring agent) may be used in the form of a liquid dispersion in which the colored particle is dispersed with an appropriate dispersing agent (e.g., a low or high molecular weight dispersing agent, a surfactant). For example, a colored particle may be used in the form of a liquid dispersion of the coloring agent which obtained by the anionic resin, whose acid group may be neutralized, and a coloring agent may be subjected to dispersing treatment in the presence of a hydrophobic organic solvent (e.g., the reaction solvent in the polymerization). The amount of the coloring agent may for example be about 2 to 100 parts by weight, preferably about 5 to 75 parts by weight, and more preferably about 5 to 50 parts by weight relative to 100 parts by weight of the resin in terms of solid bases.

Moreover, the dispersion treatment of the colored particle (coloring agent) may be conducted by utilizing various means for dispersion, for example, a dispersion apparatus such as an ultrasonication apparatus or a ball mill, as far as the colored particle is dispersible in the hydrophobic disperse medium (oil phase).

More specifically, the step for preparing the liquid organic dispersion may for example be conducted as follows. A resin solution is obtained by preparing a liquid organic solvent containing a resin (for example, a copolymer comprising a styrene-(meth)acrylate-(meth)acrylic acid-series copolymer and others, and a copolymer having a number average molecular weight of about $5 \times 10^3$ to $5 \times 10^4$) having an appropriate acid value based on carboxyl group (e.g., an acid value of 20 to 400 mgKOH/g), and a crosslinkable group, and neutralizing the acid group of the resin with a base to suitable neutralization degree (e.g., a neutralization degree of about 10 to 40 mol %). On the other hand, a liquid dispersion containing the coloring agent is prepared by subjecting a coloring agent or colorant (organic pigment or inorganic pigment) to a dispersing treatment together with the resin (a resin which may be subjected to neutralization treatment) in the presence of a hydrophobic solvent. Then, the resin solution and the liquid dispersion containing the coloring agent may be mixed together to give a liquid organic dispersion containing the dispersed coloring agent.

In the capsule production step (dispersion step), an aqueous medium (particularly water) may be added to the liquid organic dispersion (coloring agent dispersed in oil phase) in which the colored particle is dispersed in the oil phase with inducing phase inversion emulsification to produce a water dispersion containing a capsule particle whose core material is encapsulated (or enclosed) in the anionic resin, or the liquid organic dispersion may be added to the aqueous medium with emulsifying/dispersing to produce the water dispersion containing the capsule particle. This dispersion (phase inversion emulsification, emulsification/dispersion) is usually conducted with acting a shearing force on the mixed system comprising the liquid organic dispersion containing the coloring agent and the aqueous medium (particularly water). The shearing force may be a shearing force such as agitation, or a shearing force due to vibration such as ultrasonic waves. The phase inversion emulsification is usually carried out under agitation in practical cases. In the phase inversion emulsification step, when an aqueous medium for an aqueous medium phase (W-phase) is added to an organic continuous phase (O-phase) containing a resin whose acid group is neutralized and an organic solvent, the continuous phase is changed or transformed from the organic continuous phase (O-phase) to the water continuous phase or water medium phase (W-phase) with emulsifying the organic phase to a discontinuous phase (that is, phase inversion emulsification). Thus, the resin is localized around the organic phase to form a water dispersion in which the capsule particle enclosing the organic phase is stably dispersed in the water medium. More specifically, capsule particles can be produced by mixing a resin solution containing a resin having a neutralized acid group with a liquid dispersion of a coloring agent, and adding water to the obtained mixture under agitation with bringing (or inducing) the mixture to a phase inversion emulsification. In agitation, an appropriate shearing force for mixing the aqueous medium phase and the organic phase uniformly may be acted on the mixture, and a water dispersion containing a capsule particle can be obtained without taking particular means.

The proportion of the organic continuous phase (O-phase) or liquid organic dispersion relative to the aqueous solution for the aqueous medium phase (W-phase) may be such a range that a capsule particle is obtainable, for example, the former/the latter may be about 10/90 to 50/50 (weight ratio), preferably about 20/80 to 50/50 (weight ratio), and more preferably about 25/75 to 50/50 (weight ratio).

The dispersing treatment (phase inversion emulsification or emulsification/dispersion) may be conducted at an appropriate temperature (for example, about 5 to 40° C., preferably about 15 to 30° C., and particularly a room temperature), and if necessary by or under cooling or heating. Moreover, in the dispersing treatment (phase inversion emulsification or emulsification/dispersion), the smaller the temperature difference between the liquid oil-based dispersion containing the coloring agent (or liquid organic dispersion) and the aqueous medium is preferred. The temperature difference between the both may for example be usually about 0 to 15° C. (preferably about 0 to 10° C., and particularly about 0 to 5° C.). Incidentally, in the phase inversion process, if the shearing force due to agitation is too small, a capsule particle having a broad size distribution is liable to be formed. Meanwhile, if the shearing force is excessively large, the formed capsule particle is broken and an aggregate or highly fine particle is formed, and there is a possibility that the particle size distribution becomes larger.

The emulsified mixture formed by the phase inversion emulsification or emulsification/dispersion comprises a microcapsule particle enclosing a disperse system, and a disperse medium (solvent phase) in which the microcapsule is dispersed, where the solvent phase comprises water and an organic solvent (organic solvent other than a hydrophobic dispersion medium for a coloring agent which is enclosed in the capsule particle and constitutes a disperse system). Therefore, the emulsified mixture formed by the dispersing treatment (e.g., phase inversion emulsification, emulsification/dispersion) is usually subjected to an organic solvent-removing treatment to form a liquid aqueous dispersion having a microcapsule particle dispersed in an aqueous medium. The organic solvent may be removed by a conventional method, for example, distillation, particularly distillation under reduced pressure. As described above, the organic solvent preferably has a low-boiling point in view of distillation. Moreover, for adjusting the concentration of the dispersion, to the obtained liquid aqueous dispersion may be optionally added or supplemented an aqueous medium.

In the present invention, in the step for dispersing at least the liquid organic dispersion in an aqueous medium, the liquid organic dispersion may contain a solvent having an affinity to both the resin constituting the wall and the aqueous medium. Such a solvent may be a polar solvent (polar organic solvent) dissolving the resin constituting the wall and being miscible with the aqueous medium. The liquid organic dispersion may contain such a solvent (the polar solvent) and a hydrophobic organic solvent, as an organic solvent (an organic solvent constituting the liquid organic dispersion). The miscible solvent may be used as a polymerization solvent in the polymerization reaction for producing an anionic resin constituting a wall, or may be used as a solvent in the neutralization step for neutralizing the anionic resin.

Thus, the liquid organic dispersion comprising the solvent having the affinity to both the resin and the aqueous medium stabilizes the disperse system without the need of increasing the neutralization degree of the anionic resin to form the capsule particle easily. In such a system, the neutralization degree of the anionic resin can for example be suppressed to not more than 40%, and an unneutralized acid group may be utilized for crosslinking or curing reaction of the wall resin.

The organic solvent having the affinity to both the resin and the aqueous medium may be a polar solvent as described above, or a nonpolar solvent. The organic solvent includes, for example, an alcohol [e.g., a linear or branched aliphatic alcohol (e.g., a lower aliphatic alcohol such as methanol, ethanol, 1-propanol, 2-propanol, 1-butanol, 2-butanol, or 2-methyl-2-propanol)], an ether [e.g., a cyclic ether such as tetrahydrofuran, or tetrahydropyran; a cellosolve (e.g., methylcellosolve, ethylcellosolve)], a ketone (e.g., a linear ketone such as acetone, or methylethylketone), an amide (e.g., methylformamide, dimethylformamide), an ester (e.g., methyl acetate, ethyl acetate), or others. These solvents may be used singly or in combination. Among these solvents, it is preferred to use a solvent having a higher volatility or lower boiling point compared with that of the aqueous medium or hydrophobic organic solvent, and for example, the solvent having a higher volatility or lower boiling point may have a boiling point of not more than 120° C. (e.g., about 45 to 120° C.), preferably not more than 100° C. (e.g., about 50 to 100° C.), and particularly about 50 to 95° C. Such a solvent includes, for example, a $C_{1-4}$ aliphatic alcohol (in particular, ethanol, 2-propanol, 2-methyl-2-propanol), a cyclic ether, acetone, ethyl acetate, and others.

The crosslinking or curing step is conducted by crosslinking or curing the resin constituting the capsule particle by self-crosslinking or with a crosslinking agent (or curing agent). The crosslinking or curing of the wall enhances the strength of the capsule particle, and improves barrier property to the oil phase. The crosslinking agent may be selected depending on the species of the crosslinkable functional group of the resin, and for example, the following combinations may be used.

(1) When the crosslinkable functional group is a carboxyl group, examples of the crosslinking agent include an aminoplast resin (for example, a resin having a methylol group or an alkoxymethyl group such as a urea resin, a guanamine resin, and a melamine resin), a glycidyl group-containing compound (or polyepoxy resin or epoxy resin), a carbodiimide group-containing compound (a polycarbodiimide compound), an oxazoline group-containing compound (a polyoxazoline compound), a metal chelate compound, and others.

(2) When the crosslinkable functional group is a hydroxyl group, the crosslinking agent includes, for example, an aminoplast resin, a polyisocyanate compound which may be blocked, an alkoxysilane compound, and others.

(3) When the crosslinkable functional group is a glycidyl group, examples of the crosslinking agent include a carboxyl group-containing compound (a polycarboxylic acid or an acid anhydride thereof), a polyamine compound, a polyaminoamide compound, a polymercapto compound, and others.

The crosslinking agents may be used singly or in combination. Incidentally, the crosslinking agent usually has a plurality of reactive groups per molecule. The preferred combination includes (a) a combination of a carboxyl group which can impart hydrophilicity to the resin by neutralization and also acts as a crosslinkable functional group, and a carbodiimide group-containing compound (polycarbodiimide compound); (b) a combination of a carboxyl group and a polyepoxy compound or an epoxy resin; (c) a combination of a hydroxyl group and a polyisocyanate compound; and other combinations.

The carbodiimide group-containing compound includes, for example, a dialkylcarbodiimide (e.g., a $diC_{1-10}$ alkylcarbodiimide such as diethylcarbodiimide, dipropylcarbodiimide, and dihexylcarbodiimide); a dicycloalkylcarbodiimide (e.g., a $diC_{3-10}$ cycloalkylcarbodiimide such as dicyclohexylcarbodiimide); an arylcarbodiimide (e.g., di-p-tolylcarbodiimide, an arylpolycarbodiimide such as triisopropylbenzenepolycarbodiimide); and others. These carbodiimides may be used singly or in combination.

Among the crosslinking agents, the polyepoxy compound (also including an epoxy resin) includes a glycidyl ether-series epoxy compound, a glycidyl ester-series epoxy compound, a glycidyl amine-series epoxy compound, a cyclic aliphatic epoxy resin (e.g., an alicyclic diepoxy acetal, an alicyclic diepoxyadipate, an alicyclic diepoxycarboxylate, a vinylcyclohexane dioxide), a heterocyclic epoxy resin (e.g., triglycidyl isocyanurate (TGIC), a hydantoin-based epoxy resin), and others.

Examples of the glycidyl ether-series epoxy compound include a glycidyl ether obtained by a reaction of a polyhydroxy compound (e.g., a bisphenol, a polyhydric phenol, an alicyclic polyhydric alcohol, an aliphatic polyhydric alcohol) and epichlorohydrin, a novolak epoxy resin, and others. The glycidyl ether-series epoxy compound includes, depending on the species of the polyhydroxy compound, for example, a glycidyl ether of a bisphenol [for example, a diglycidyl ether of a bisphenol (e.g., a bis(hydroxyphenyl) alkane such as 4,4'-dihydroxybiphenyl, bisphenol A, bisphenol F, or bisphenol AD), such as a bisphenol-based epoxy resin such as a bisphenol A diglycidyl ether (a bisphenol A-based epoxy resin), a bisphenol F-based epoxy resin, or a bisphenol AD-based epoxy resin; a diglycidyl ether of a $C_{2-3}$alkylene oxide adduct to a bisphenol], a glycidyl ether of a polyhydric phenol (e.g., a diglycidyl ether of resorcin, or hydroquinone), a glycidyl ether of an alicyclic polyhydric alcohol (e.g., diglycidyl ether of cyclohexanediol, cyclohexanedimethanol, or hydrogenerated bisphenol), a glycidyl ether of an aliphatic polyhydric alcohol (e.g., a diglycidyl ether of an alkylene glycol such as ethylene glycol, or propylene glycol; a polyoxy$C_{2-4}$alkylene glycol diglycidyl ether such as a polyethylene glycol diglycidyl ether), a novolak epoxy resin (e.g., a phenol-novolak or cresol-novolak epoxy resin), and others. The bisphenol A-based epoxy compound is, for example, available from Japan Epoxy Resins Co., Ltd. as "Epikote (registered trademark) 828". Moreover, trade name "EPICLON 850" (manufactured by Dainippon Ink And Chemicals, Inc.) as bifunctional glycidyl ether, and trade name "TECHMORE" (manufactured by Mitsui Chemicals, Inc.) as a trifunctional glycidyl ether are also commercially available.

The glycidyl ester-series epoxy compound includes a polycarboxylic acid polyglycidyl ester, for example, a diglycidyl ester of an aromatic dicarboxylic acid such as phthalic acid, isophthalic acid, terephthalic acid, or dimethylphthalic acid; a diglycidyl ester of an alicyclic dicarboxylic acid such as tetrahydrophthalic acid, hexahydrophthalic acid, or dimethylhexahydrophthalic acid; a diglycidyl ester of a dimer acid, or a modified product thereof; and others.

Examples of the glycidyl amine-series epoxy compound include a reaction product of an amine and epichlorohydrin, e.g., an N-glycidyl aromatic amine [e.g., tetraglycidyl diaminodiphenylmethane (TGDDM), triglycidyl aminophenol (such as TGPAP or TGMAP), diglycidyl aniline (DGA), diglycidyl toluidine (DGT), tetraglycidyl xylylenediamine (e.g., TGMXA)], an N-glycidyl alicyclic amine (e.g., tetraglycidyl bisaminocyclohexane, m-bis(N,N-diglycidyl aminomethyl)cyclohexane, and others. Incidentally, for example, TGMXA is commercially available as "TETRAD (registered trademark)-X" from Mitsubishi Gas Chemical Company, Inc., and m-bis(N,N-diglycidyl aminomethyl)cyclohexane as "TETRAD (registered trademark)-C" from Mitsubishi Gas Chemical Company, Inc.

As the polyisocyanate compound, there may be mentioned a diisocyanate compound [e.g., an aliphatic diisocyanate such as hexamethylene diisocyanate (HMDI) or 2,2,4-trimethylhexamethylene diisocyanate; an alicyclic diisocyanate such as isophorone diisocyanate (IPDI); an aromatic diisocyanate such as tolylene diisocyanate (TDI), or diphenylmethane-4,4'-diisocyanate (MDI); an araliphatic diisocyanate such as xylylene diisocyanate], a triisocyanate compound (e.g., an aliphatic triisocyanate such as lysine ester triisocyanate, or 1,3,6-triisocyanatohexane; an alicyclic triisocyanate such as 1,3,5-triisocyanatocyclohexane; an aromatic triisocyanate such as triphenylmethane-4,4',4"-triisocyanate), and a tetraisocyanate compound (4,4'-diphenylmethane-2,2',5,5'-tetraisocyanate). The polyisocyanate compound may be a block isocyanate which is blocked or masked with phenol, alcohol, caprolactam or others.

The polycarboxylic acid includes a dicarboxylic acid (e.g., an aliphatic dicarboxylic acid such as adipic acid; an alicyclic dicarboxylic acid such as hexahydrophthalic acid; an aromatic dicarboxylic acid such as phthalic acid or terephthalic acid), a tricarboxylic acid such as trimellitic acid, a tetracarboxylic acid such as pyromellitic acid, or others. The acid anhydride of the polycarboxylic acid also includes an anhydride of the above-mentioned polycarboxylic acid, dodecenylsuccinic acid anhydride, methyltetrahydrophthalic acid anhydride, phthalic acid anhydride, HET acid anhydride, or others.

Examples of the polyamine compound includes a hydrazine (e.g., hydrazine, a dihydrazide of an organic acid), an aliphatic polyamine (e.g., a $C_{2-10}$alkylene diamine such as ethylene diamine, propylene diamine, trimethylene diamine, and hexamethylene diamine; diethylene triamine, triethylene tetramine, tetraethylene pentamine, and pentaethylene hexamine), an alicyclic polyamine (e.g., diaminocyclohexane, menthene diamine, isophorone diamine, di(aminomethyl)cyclohexane, bis (4-aminocyclohexyl)methane, and bis (4-amino-3-methylcyclohexyl)methane), an aromatic polyamine [e.g., a $C_{6-10}$arylene diamine such as phenylene diamine and diaminotoluene; xylylene diamine, di(2-amino-2-propyl)benzene; 4,4'-biphenylene diamine, biphenylenebis (4-aminophenyl)methane, bis-(4-amino-3-chlorophenyl)methane], or others.

The crosslinking agent (e.g., the carbodiimide compound) is preferably dissolved in either the oil phase or the aqueous phase. With respect to the carbodiimide compound, the compound having hydrophilicity is available as a hydrophilic carbodilite ("V-02", "V-02-L2", and "V-04", each manufactured by Nisshinbo Industries, Inc.), and a compound having lipophilicity as a lipophilic carbodilite ("V-05" and "V-07", each manufactured by Nisshinbo Industries, Inc.).

The proportion of the resin having the crosslinkable functional group relative to the crosslinking agent is not particularly limited to a specific ratio, and the ratio of the reactive group of the crosslinking agent (such as a carbodiimide group and epoxy group) relative to 1 equivalent of the crosslinkable functional group (such as a carboxyl group) may be selected from about 0.1 to 2 equivalent, usually about 0.1 to 1 equivalent (e.g., about 0.1 to 0.8 equivalent), preferably about 0.2 to 0.7 equivalent, and more preferably about 0.3 to 0.7 equivalent. Incidentally, if necessary, the combination use of a plurality of crosslinking agents (e.g., the carbodiimide compound and other crosslinking agent) is also effective.

The crosslinking agent may be contained in at least one phase of an oil phase (liquid organic dispersion) and a water phase (aqueous medium) as far as the crosslinking agent can be contained in or bonded or adhered to the resin, and the timing to be added is not particularly limited to a specific time. For example, the crosslinking agent may be added to an oil-based mixture (liquid organic dispersion) obtained in the step for preparing the liquid organic dispersion, or may be added to an organic solvent in advance of the preparation of the liquid organic dispersion. Moreover, the crosslinking agent may be added to an emulsified dispersion obtained in the dispersing step (such as phase inversion emulsification step or emulsification/dispersion step) or to a liquid aqueous dispersion in which the organic solvent has been eliminated from the solvent phase. In the case using the hydrophobic or oil-soluble crosslinking agent, it is advantageous that the crosslinking agent is added to an organic phase (e.g., in the step for preparing the liquid organic dispersion, to the obtained liquid organic dispersion, or to the organic solvent).

When the hydrophilic or water-soluble crosslinking agent is used, it is advantageous that the crosslinking agent is added to a water phase [e.g., in the phase inversion emulsification step or to the liquid dispersion obtained by the phase inversion emulsification or emulsification/dispersion (in particular a liquid aqueous dispersion formed by eliminating the organic solvent from the solvent phase)]. In the preferred embodiment, after forming the liquid aqueous dispersion containing the capsule particle, the crosslinking agent (hydrophilic or water-soluble crosslinking agent) may be added to crosslink or cure the wall resin of the capsule particle in an aqueous medium. If necessary, a hydrophobic or oil-soluble crosslinking agent and a hydrophilic or water-soluble crosslinking agent may be added in a suitable step to react the crosslinkable functional group of the resin component with the crosslinking agent. Further, if necessary, in order to accelerate the crosslinking reaction, the crosslinking agent may be used in combination with catalyst(s) (e.g., an acid catalyst, and a basic catalyst).

The crosslinking or curing of the resin may be conducted at a suitable temperature, and may be usually conducted by heating with stirring. Incidentally, the crosslinking or curing is carried out in the presence of an aqueous solvent or a hydrophobic solvent in practical cases. Therefore, the crosslinking or curing is usually carried out, with stirring the liquid dispersion, at a temperature not higher than a boiling point of the solvent (preferably an aqueous medium, particularly water) for example, at a temperature of about 50 to 100° C., preferably about 50 to 90° C., and more preferably about 50 to 80° C. The crosslinking or curing reaction may for example be completed in about 10 minutes to 48 hours (e.g., about 10 minutes to 12 hours), preferably about 30 minutes to 24 hours (e.g., about 1 to 5 hours). Further, in order to inhibit adhesion or agglomeration of the microcapsule particle, the crosslinking or curing reaction may be conducted at a temperature lower than the glass transition temperature of the wall (or resin).

In the present invention, after the resin constituting the wall is crosslinked or cured with a crosslinking agent, and then the unreacted crosslinking agent may be further crosslinked or cured with a polyfunctional compound to increase the crosslinking degree of the wall. The crosslinking or curing with the polyfunctional compound further inhibits leakage of the disperse system from the microcapsule and improves the strength of the microcapsule.

The polyfunctional compound has a plurality of functional groups crosslinkable or curable with a crosslinkable group of the crosslinking agent, and preferably has relatively low molecular weight.

The polyfunctional compound may be selected depending on the crosslinkable group of the crosslinking agent, and includes, for example, the following compounds:

(1) in the case where the crosslinkable group is glycidyl group (epoxy group); a polycarboxylic acid or an anhydride thereof, and a polyamine compound,
(2) in the case where the crosslinkable group is methylol group or an alkoxymethyl group; a polycarboxylic acid or an anhydride thereof, and a polyhydroxy compound,
(3) in the case where the crosslinkable group is carbodiimide group, oxazoline group, or a metal chelate; a polycarboxylic acid or an anhydride thereof,
(4) in the case where the crosslinkable group is silyl group or alkoxysilyl group; a polyhydroxy compound,
(5) in the case where the crosslinkable group is isocyanate group; a polyhydroxy compound, and a polyamine compound,
(6) in the case where the crosslinkable group is carboxyl group; a polyhydroxy compound, a polyepoxy compound, and a polyamine compound,
(7) in the case where the crosslinkable group is amino group; a polycarboxylic acid or an anhydride thereof, a polyepoxy compound, and a polyisocyanate compound, and
(8) in the case where the crosslinkable group is mercapto group; a polyepoxy compound.

Among the polyfunctional compounds, examples of the polyhydroxy compound include a diol [e.g., an aliphatic diol such as an alkylene glycol (e.g., ethylene glycol), or a polyoxyalkylene glycol (e.g., diethylene glycol); an alicyclic diol such as 1,4-cyclohexanediol, 1,4-cyclohexanedimethanol, or a hydrogenated bisphenol A; and an aromatic diol such as hydroquinone, resorcinol, biphenol, 2,2-bis(4-hydroxyphenyl)propane, 2,2-bis(4-(2-hydroxyethoxy)phenyl) propane, or xylylene glycol], a triol (e.g., glycerin, trimethylolpropane, trimethylolethane), a tetraol (e.g., pentaerythritol), or others.

As the polyepoxy compound, there may be mentioned a compound having relatively lower molecular weight among the above-mentioned epoxy compounds, for example, a glycidyl ether of a polyhydroxy compound such as a polyhydric phenol, an alicyclic polyhydric alcohol, or an aliphatic polyhydric alcohol; a polyglycidyl ester of a polycarboxylic acid; an N-glycidyl aromatic amine; an N-glycidyl alicyclic amine; and others. The polycarboxylic acid, the polyisocyanate compound, and the polyamine compound include a compound exemplified in the paragraph of the crosslinking agent.

These polyfunctional compounds may be used singly or in combination.

The proportion of the polyfunctional compound relative to the unreacted crosslinkable group of the crosslinking agent is not particularly limited to a specific one. For example, the proportion may be selected from about 0.1 to 2 equivalent of the functional group of the polyfunctional compound (e.g., an amino group of a polyamine compound) relative to 1 equivalent of the crosslinkable group (e.g., glycidyl group), and may be usually selected from about 0.1 to 1 equivalent (e.g., about 0.1 to 0.8 equivalent), preferably about 0.2 to 0.7 equivalent, and more preferably about 0.3 to 0.7 equivalent of the functional group of the polyfunctional compound relative to 1 equivalent of the crosslinkable group (e.g., glycidyl group).

The timing to be added of the polyfunctional compound is not particularly limited to a specific one, and the polyfunctional compound is preferably added after crosslinking or curing the wall of the capsule particle with the crosslinking agent.

Moreover, the crosslinking or curing reaction with the polyfunctional compound may be conducted at any side of the outer side of the wall (water phase side) or the inner side thereof (oil phase side), or may be conducted at the interface between the oil phase and the water phase. In the case where the crosslinking agent is contained in the oil phase of the capsule particle, a water-soluble polyfunctional compound permeates through the wall and ensures crosslinking inside of the wall.

In the production process of the microcapsule, in the drying step, the powdery microcapsule (capsule type display element or ink) enclosing the disperse system (oil disperse system or core material) may be obtained by separating the capsule particle from the aqueous medium for drying. The drying may be conducted by subjecting the liquid aqueous dispersion containing the capsule particle to conventional means for drying (such as spray drying or lyophilization), or may be performed with the use of a conventional manner (such as spray drying or lyophilization) after filtrating the capsule particle with a separation manner (such as filtration or centrifugation) to form a wet cake comprising the capsule particle.

The capsule particle may be subjected to hydrolyzing treatment with an acid to liberate the neutralized acid group of the resin. As the acid, any of an organic acid and an inorganic acid may be used if the acid liberates the acid group. As the acid, there may be mentioned, for example, an organic acid such as an organic carboxylic acid (e.g., formic acid, acetic acid, trichloroacetic acid, trifluoroacetic acid), and an organic sulfonic acid (e.g., methanesulfonic acid, benzenesulfonic acid, p-toluenesulfonic acid); a mineral acid or inorganic acid such as hydrochloric acid and phosphoric acid. The acid may be usually used in the form of an acidic aqueous solution. The hydrolyzing treatment may be directed to a capsule particle separated from an aqueous medium or a dried capsule particle, and may be usually conducted by adding an acid to a liquid aqueous dispersion containing a capsule particle, and if necessary under heating.

According to the present invention, the microcapsule being substantially free from a dispersion stabilizer and enclosing therein an oil phase-disperse system in which a coloring agent is dispersed in an oil phase can be obtained by dispersing treatment such as phase inversion emulsification or emulsification/dispersion with simple manner. Furthermore, the process certainly realizes microcapsule production without the formation of a particle free from a core material. Thus a removal step of new non-microcapsule-like particle is omissible. Moreover, the particle size of the microcapsule can be easily controlled, and a microcapsule having a normal distribution and a narrow particle size distribution can be also obtained.

According to the present invention, since a specific resin is utilized, a microcapsule encapsulating or enclosing a disperse system in which a colored particle is dispersed in an oil phase and having a controlled particle size can be obtained. Moreover, such a microcapsule contains an electrophoretically movable colored particle in an oil phase and has a sharp and uniform particle size independent of a dispersiveness of a core material, as well as reduces the thickness of the wall by increasing the strength of the wall and has high transparency (or clearness). Further, the microcapsule has high stability, durability, and transparency (clearness) even when the microcapsule contains a core material. Furthermore, the present invention ensures efficient production of a microcapsule having the above-mentioned properties without using an emulsifying and dispersing agent. In particular, according to the present invention, a microcapsule encapsulating or enclosing the above-mentioned disperse system can be certainly produced positively with inhibiting the formation of non-capsule particle.

INDUSTRIAL APPLICABILITY OF THE INVENTION

The microcapsules of the present invention are useful for an image display device (or element) for forming an image by an electrophoresis of a colored particle in response to applying a voltage between electrodes.

EXAMPLES

The following examples are intended to describe this invention in further detail and should by no means be interpreted as defining the scope of the invention. Incidentally, "part(s)" and "%" indicate the proportion by weight in the following examples and comparative example.

Example 1

[Preparation of Anionic Resin]

To a reaction vessel, 110 parts of 2-propanol and one part of a polymerization initiator AIBN (2,2'-azobisisobutyronitrile) were charged, and mixed together. To the mixture, a monomer mixture containing 78 parts of methyl methacrylate, 14 parts of butyl acrylate and 8 parts of methacrylic acid were added dropwise over 3 hours at 80° C. under nitrogen atmosphere. After completion of dropping, a mixture of 11 parts of 2-propanol and 0.2 part of AIBN was added to the reaction mixture, and the resultant mixture was maintained at 80° C. for 4 hours to give a resin solution containing a solid matter (heating residue) of 45%.

[Preparation Example of Encapsulated Ink]

To 11 parts of the above-described resin solution was added 88 parts of 2-propanol. To the mixture was added 1.5 parts of 10% aqueous solution containing DMAE (dimethylaminoethanol) at 40° C. for neutralization treatment (neutralization degree of about 35 mol %).

On the other hand, a mixture of 100 parts of diisopropylnaphthalene ("KMC-113", manufactured by Kureha Chemical Industry Co., Ltd.) and 1 part of oil blue was heated with stirring. The mixture was allowed to dissolve fully at 90° C., kept for 20 minutes, and cooled to a room temperature. To 100 parts of the resultant colored solution, 10 parts of titanium oxide ("A100", manufactured by Ishihara Sangyo Kaisha, Ltd.) was dispersed to prepare a colored liquid dispersion.

The resultant colored liquid dispersion (100 parts) was mixed with the neutralized resin solution as described above at 40° C., and thereto was added dropwise 200 parts of deionized water with stirring to conduct or induce phase inversion emulsification. The mixture obtained by phase inversion emulsification was subjected to the following after-treatment process to give a powdery microcapsule. That is, with removing 2-propanol from the emulsified mixture by distillation under reduced pressure for producing an aqueous dispersion, 100 parts of deionized water was added to the resulting aqueous dispersion. A polycarbodiimide-series crosslinking agent (0.5 part, "CARBODILITE V-02-L2", manufactured by Nisshinbo Industries, Inc.) was added to the resultant dispersion to conduct crosslinking reaction at 60° C. for 2 hours. After the crosslinking treatment, the aqueous dispersion was filtrated, deionized water (300 parts) was added to the resultant cake, and the mixture was adjusted to pH 2 to 3 with acetic acid under stirring, dried by a spray dryer to give a capsule powder. The mean particle size of thus obtained capsule was 12 μm. The glass transition temperature (Tg) of the wall was 120° C.

Example 2

[Preparation of Anionic Resin]

An anionic resin (resin solution) was prepared in the same manner as in Example 1.

[Preparation Example of Encapsulated Ink]

To 11 parts of the resin solution was added 88 parts of 2-propanol, and 1.5 parts of 10% aqueous solution containing DMAE (dimethylaminoethanol) was to the mixture added at 40° C. for neutralization treatment (neutralization degree of about 35 mol %).

One (1) part of oil blue was mixed with 100 parts of diisopropylnaphthalene (manufactured by Kureha Chemical Industry Co., Ltd.), and heated with stirring. The mixture was allowed to dissolve fully at 90° C., kept for 20 minutes, and cooled to a room temperature to obtain a colored solution. Ten (10) parts of titanium oxide ("A100", manufactured by Ishihara Sangyo Kaisha, Ltd.) was dispersed in 100 parts of the resultant colored solution (a solution containing diisopropylnaphthalene and oil blue) to prepare a colored liquid dispersion.

The colored liquid dispersion (100 parts) and 0.5 part of a polycarbodiimide-series crosslinking agent ("CARBODILITE V-07", manufactured by Nisshinbo Industries, Inc.) were mixed with the neutralized resin solution described above at 40° C., and 200 parts of deionized water was added dropwise to the mixture with stirring to conduct or induce phase inversion emulsification. The mixture obtained by phase inversion emulsification was subjected to the following after-treatment process to give a powdery microcapsule. That is, 2-propanol was removed from the emulsified mixture by distillation under reduced pressure for producing an aqueous solution, 100 parts of deionized water was added to the resulting aqueous dispersion, and thus obtained mixture was subjected to crosslinking reaction at 60° C. for 2 hours. After crosslinking treatment, the aqueous dispersion was filtrated, deionized water (300 parts) was added to the resultant cake, and the mixture was adjusted to pH 2 to 3 with acetic acid under stirring, dried by a spray dryer to give a capsule powder. The mean particle size of the resultant capsule was 14 µm. The glass transition temperature (Tg) of the wall was 133° C.

Example 3

[Preparation of Anionic Resin]

To a reaction vessel, 110 parts of methyl ethyl ketone and one part of a polymerization initiator AIBN were charged, and mixed together. To the mixture were added dropwise a monomer mixture containing 50 parts of styrene, 28 parts of methyl methacrylate, 4 parts of 2-hydroxyethyl methacrylate, 10 parts of butyl acrylate, and 9 parts of methacrylic acid over 3 hours at 80° C. under nitrogen atmosphere. After completion of dropping, a mixture containing 11 parts of methyl ethyl ketone and 0.2 part of AIBN was added to the reaction mixture, and maintained at 80° C. for 4 hours to give a resin solution containing a heating residue of 46%.

[Preparation Example of Encapsulated Ink]

To 11 parts of the resin solution was added 88 parts of methyl ethyl ketone, and 1.5 parts of 10% aqueous solution containing DMAE (dimethylaminoethanol) was added to the mixture for neutralization treatment (neutralization degree of about 30 mol %).

Titanium oxide (10 parts, "A100" manufactured by Ishihara Sangyo Kaisha, Ltd.) and carbon black (1 part, "MA-100" manufactured by Mitsubishi Chemical Corporation) were dispersed in 100 parts of diisopropylnaphthalene with the use of a pigment dispersion stabilizer (Solsperse 17000, manufactured by Avecia KK) to give a colored liquid dispersion.

The resultant colored liquid dispersion (100 parts) was mixed with the neutralized resin solution described above at 40° C., and was added dropwise thereto 200 parts of deionized water with stirring to conduct or induce phase inversion emulsification. The mixture obtained by phase inversion emulsification was subjected to the following after-treatment process to give a powdery microcapsule. That is, methyl ethyl ketone was removed from the emulsified mixture by distillation under reduced pressure for producing an aqueous dispersion, 100 parts of deionized water was added to the resulting aqueous dispersion. 0.5 part of a polycarbodiimide-series crosslinking agent ("CARBODILITE V-02-L2", manufactured by Nisshinbo Industries, Inc.) was added to thus obtained mixture to carry out crosslinking reaction at 60° C. for 2 hours. After crosslinking treatment, the aqueous dispersion was filtrated, deionized water (300 parts) was added to the resultant cake, and the mixture was adjusted to pH 2 to 3 with acetic acid under stirring, dried by lyophilization to give a capsule powder (yield 80%). The mean particle size of thus obtained capsule was 20 µm. The glass transition temperature (Tg) of the wall was 112° C.

Example 4

[Preparation of Anionic Resin]

An anionic resin (resin solution) was prepared in the same manner as in Example 1.

[Preparation of Encapsulated Ink]

To 11 parts of the resin solution was added 88 parts of methyl ethyl ketone, and 1.5 parts of 10% aqueous solution containing DMAE (dimethylaminoethanol) was added to the mixture for neutralization treatment (neutralization degree of about 30 mol %).

Titanium oxide (10 parts, "A100" manufactured by Ishihara Sangyo Kaisha, Ltd.) and carbon black (1 part, "MA-100" manufactured by Mitsubishi Chemical Corporation) were dispersed in 100 parts of silicone oil (manufactured by Shin-Etsu chemical Co., Ltd.) with the use of a pigment dispersion stabilizer (Solsperse 17000, manufactured by Avecia KK) to give a colored liquid dispersion.

The resultant colored liquid dispersion (100 parts) and 0.5 part of a polycarbodiimide-series crosslinking agent ("CARBODILITE V-07", manufactured by Nisshinbo Industries, Inc.) were mixed with the neutralized resin solution described above at 40° C., and was added dropwise thereto 200 parts of deionized water with stirring to conduct or induce phase inversion emulsification. The mixture obtained by phase inversion emulsification was subjected to the following after-treatment process to give a powdery microcapsule. That is, methyl ethyl ketone was removed from the emulsified mixture by distillation under reduced pressure for producing an aqueous dispersion, 100 parts of deionized water was added to the resulting aqueous dispersion, and crosslinking reaction was conducted at 60° C. for 2 hours. After the crosslinking treatment, the aqueous dispersion was filtrated, deionized water (300 parts) was added to the resultant cake, and the mixture was adjusted to pH 2 to 3 with acetic acid under stirring, dried by lyophilization to give a capsule powder (yield 80%). The mean particle size of the resultant capsule was 25 µm. The glass transition temperature (Tg) of the wall was 121° C.

Comparative Example 1

A resin solution (hating residue: 46%) was prepared in the same manner as in Example 3 except for using a monomer mixture containing 50 parts of styrene, 37 parts of methyl methacrylate, 4 parts of 2-hydroxyethyl methacrylate and 10 parts of butyl acrylate. No acid group-containing monomer (such as methacrylic acid) was used. A mixture containing the coloring mixture and the resin solution was tried to phase inversion emulsification by adding deionized water in the same manner as in Example 3 except for using the above-mentioned resin solution, but the resin was separated out (or deposited), as a result phase inversion emulsification could not be conducted. This matter was caused by the resin having no capacity for phase inversion emulsification due to the resin without an acid groups.

The results are shown in Table 1.

TABLE 1

|  | Particle size distribution | Tg (° C.) | State of capsule dispersion | Electrophoretic property |
|---|---|---|---|---|
| Ex. 1 | 12 ± 6 μm | 120 | Good capsule is produced | Good (blue ⇔ white) |
| Ex. 2 | 14 ± 8 μm | 133 | Good capsule is produced | Good (blue ⇔ white) |
| Ex. 3 | 20 ± 9 μm | 112 | Good capsule is produced | Good (blue ⇔ white) |
| Ex. 4 | 25 ± 10 μm | 121 | Good capsule is produced | Good (black ⇔ white) |
| Com. Ex. 1 | 0.05 to 10 μm | — | No phase inversion emulsification | — |

Example 5

[Preparation of Anionic Resin]

A monomer mixture containing 1.5 parts of a polymerization initiator 2,2'-azobis-2,4'-dimethylvaleronitrile (ADVN), 60 parts of methyl methacrylate, 15 parts of butyl acrylate and 25 parts of methacrylic acid was added dropwise to 120 parts of 2-propanol in a reaction vessel over 2 hours at 80° C. under nitrogen atmosphere. Two (2) hours and 5 hours after completion of dropping, a mixture containing 11 parts of 2-propanol and 0.5 part of ADVN was added to the reaction mixture over twice. The resulting product was kept at 80° C. for further 4 hours to obtain a resin solution containing a solid matter (heating residue) of 43%. The acid value of the obtained resin was 162.9 mgKOH/g.

[Preparation Example of Colored Liquid Dispersion]

A mixture containing 50 parts of diisopropylnaphthalene ("KMC-113", manufactured by Kureha Chemical Industry Co., Ltd.), 0.1 part of oil blue, and 0.5 part of a pigment-dispersing agent ("Solsperse 17000", manufactured by Avecia KK) was heated at 90° C. with stirring to dissolve the mixture completely. The mixture was kept at 90° C. for 20 minutes, then cooled to a room temperature. To 50.6 parts of the resultant obtained colored solution, 5 parts of titanium oxide ("CR-90", manufactured by Ishihara Sangyo Kaisha, Ltd.) was dispersed to prepare a colored liquid dispersion.

To 55.6 parts of the colored liquid dispersion was added 7.4 parts of a crosslinking agent [an epoxy resin "TETRAD (registered trademark)-X", manufactured by Mitsubishi Gas Chemical Company, Inc.], and the mixture was stirred at a room temperature for 10 minutes.

[Preparation of Encapsulated Ink]

To 46.5 parts of the resin solution was added 53.5 parts of 2-propanol. To the mixture was added 2 parts of 10% DMAE aqueous solution at a room temperature for neutralization treatment (neutralization degree of about 35 mol %).

The neutralized resin solution (100 parts) was mixed with the colored liquid dispersion containing the crosslinking agent (63 parts) at a room temperature, and was added dropwise thereto 150 parts of deionized water with stirring to conduct or induce phase inversion emulsification. Then, the mixture obtained by phase inversion emulsification was heated to 80° C. for 30 minutes to progress crosslinking between the crosslinking agent and a carboxyl group in the resin constituting the phase inversion emulsion. Thereafter, the resultant emulsified mixture was subjected to distillation under reduced pressure to eliminate 2-propanol, and 300 parts of deionized water was added to thus obtained liquid aqueous dispersion to subject to a crosslinking reaction between the crosslinking agent and the carboxyl group at 80° C. overnight. After the crosslinking treatment, 6.1 parts of diethylene triamine was added to the resultant liquid microcapsule aqueous dispersion to allow the crosslinking agent remaining in the capsule to react at the oil/water interface. Then, the liquid aqueous dispersion was filtrated, and 300 parts of deionized water was added to thus obtained cake under stirring to adjust to pH 2 to 3 with acetic acid, and dried by a spray drier to obtain a capsule powder. The mean particle size of the capsule was 35 μm, and the mean thickness of the wall was 250 nm. Moreover, the glass transition temperature (Tg) of the wall was 200° C.

Example 6

[Preparation of Anionic Resin]

An anionic resin (resin solution) was prepared in the same manner as in Example 5.

[Preparation Example of Colored Liquid Dispersion]

A colored liquid dispersion containing a crosslinking agent was prepared in the same manner as in Example 5 except that ISOPAR G (manufactured by Exxon Mobil Corporation) and 15.7 parts of TECHMORE (an epoxy resin manufactured by Mitsui Chemicals, Inc.) were used instead of diisopropyl naphthalene and 7.4 parts of TETRAD(registered trademark)-X, respectively.

[Preparation Example of Encapsulated Ink]

An encapsulated ink was prepared in the same manner as in the preparation example of the encapsulated ink in Example 5. The mean particle size of the capsule was 40 μm and the mean thickness of the wall was 500 nm. Moreover, the Tg of the wall was 180° C.

Example 7

[Preparation of Anionic Resin]

To 100 parts of methyl ethyl ketone in a reaction vessel was added dropwise a monomer mixture containing 1 part of a polymerization initiator ADVN, 50 parts of acrylic acid, 25 parts of 2-ethylhexyl acrylate and 25 parts of styrene at 80° C. over 2 hours under nitrogen atmosphere. Two (2) hours and 5 hours after completion of dropping, a mixture containing 5.5 parts of methyl ethyl ketone and 0.1 part of ADVN was added to the reaction mixture over twice. The resulting product was kept at 80° C. for further 3 hours to obtain a resin solution containing a solid matter (heating residue) of 56.2%. The acid value of the obtained resin was 389.3 mgKOH/g. The resultant resin was subjected to distillation under reduced pressure, and to vacuum drying at 100° C. for eliminating methyl ethyl ketone to give a solid resin.

[Preparation of Colored Liquid Dispersion]

A colored liquid dispersion containing a crosslinking agent was prepared in the same manner as in Example 5 except that the amount to be added of the crosslinking agent was 21.8 parts.

[Preparation of Encapsulated Ink]

A capsule powder was obtained in the same manner as in Example 5 except that 80 parts of 2-propanol was added to 20 parts of the resin solution, that 1.5 parts 10% DMAE aqueous solution was added thereto for neutralization treatment (neutralization degree of about 20 mol %), and that 10.2 parts of 1,2-bis(2-aminoethyoxy)ethane was used instead of 6.1 parts of diethylene triamine added to the resultant liquid microcapsule aqueous dispersion. The mean particle size of the resultant capsule was 28 μm, and the mean thickness of the wall was 650 nm. Moreover, the glass transition temperature (Tg) of the wall was 175° C.

Comparative Example 2

[Preparation of Anionic Resin]

To 46.5 parts of the anionic resin solution obtained in Example 5 was added 53.5 parts of 2-propanol. To the mixture was added 3.7 parts of 10% DMAE aqueous solution for neutralization treatment (neutralization degree of about 50 mol %). Deionized water (80 parts) was added to the above resin solution, and the mixture was subjected to distillation under reduced pressure for eliminating 2-propanol, and a resin aqueous solution containing 20 parts of an anionic resin was obtained.

[Preparation of Colored Liquid Dispersion]

A colored liquid dispersion was prepared in the same manner as in Example 5.

[Preparation of Encapsulated Ink]

To 100 parts of the above resin aqueous solution was added dropwise 63 parts of the colored liquid dispersion containing the crosslinking agent with stirring to give an emulsified mixture. The emulsified mixture was kept at 80° C., and subjected to a crosslinking reaction between the crosslinking agent and a carboxyl group overnight. To the resultant liquid microcapsule aqueous dispersion was added 6.1 parts of diethylene triamine to allow the crosslinking agent remaining in the capsule to react at the oil/water interface. The mean particle size of thus obtained microcapsule was 32 μm. Moreover, the glass transition temperature (Tg) of the wall was 50° C. After crosslinking treatment, the liquid aqueous dispersion was filtrated, but the microcapsule was broken and unrecoverable as a fine particle. This fact suggested that the wall of the microcapsule in Comparative Example had low mechanical strength.

The results of Examples 5 to 7 and Comparative Example 2 are shown in Table 2. The evaluation in transparency (clearness) of the microcapsules in Examples 5 and 6 are shown in Table 3.

TABLE 2

| | Particle size distribution (μm) | Wall thickness (nm) | Tg (° C.) | State of liquid capsule dispersion | Electrophoretic property |
|---|---|---|---|---|---|
| Ex. 5 | 35 ± 10 | to 250 | 200 | Good capsule is produced | Good (blue ⇔ white) |
| Ex. 6 | 40 ± 8 | to 500 | 180 | Good capsule is produced | Good (blue ⇔ white) |
| Ex. 7 | 28 ± 7 | to 650 | 175 | Good capsule is produced | Good (blue ⇔ white) |
| Com. Ex. 2 | 32 ± 15 | — | 50 | Lack of mechanical strength | — |

TABLE 3

| | Haze(%) | Total light transmittance (%) | Diffuse transmittance (%) | Parallel light transmittance (%) |
|---|---|---|---|---|
| Ex. 5 | 7.0 | 92.0 | 6.4 | 85.6 |
| Ex. 6 | 9.8 | 92.6 | 9.1 | 83.5 |

Concerning the transparency (or clearness) of the microcapsule, apparent from Table 3, the haze is below 10% in both microcapsules in Examples 5 and 6, and these microcapsules are excellent in transparency (or clearness).

[Evaluation of Wall Strength of Microcapsule]

Figure 2:
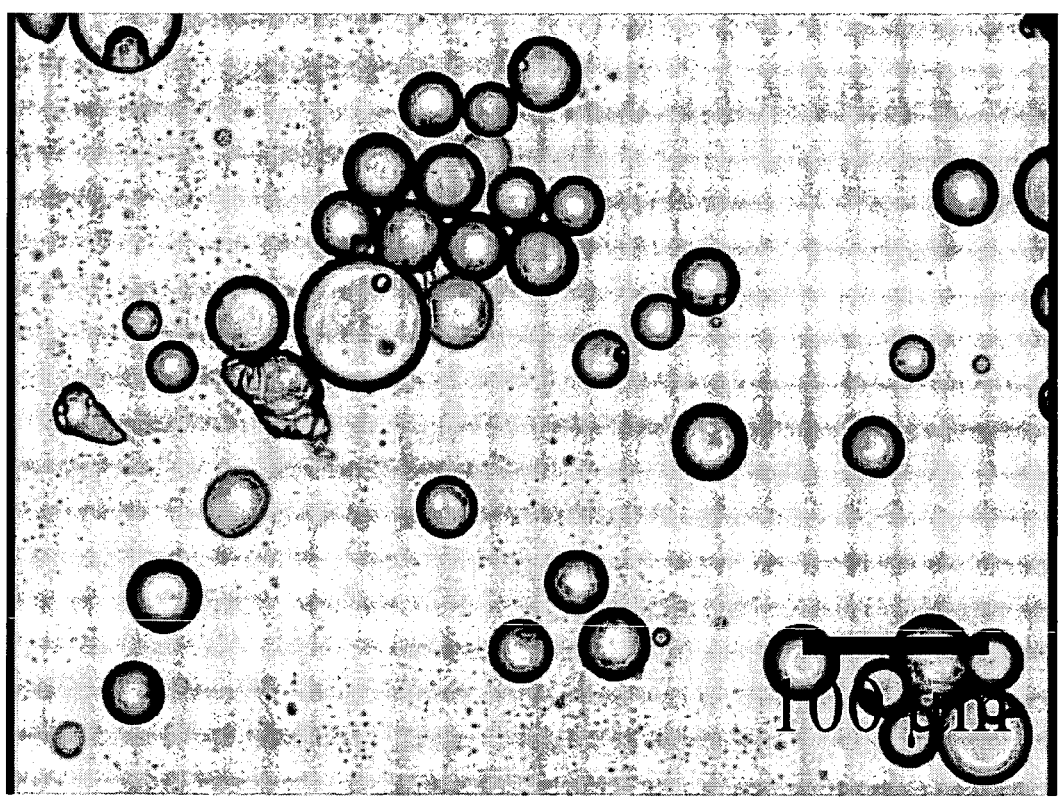
FIG. 2 shows an optical microphotograph of the liquid capsule dispersion (without both titanium oxide and a pigment-dispersing agent) obtained in Comparative Example 2.

In each of Examples 5 and Comparative Example 2, one droplet of a liquid capsule dispersion prepared without adding titanium oxide and a pigment-dispersing agent was dropped on a slide glass and covered with a cover glass, and was observed by an optical microscope. FIG. 1 and FIG. 2 show optical microphotographs of the liquid capsule dispersions corresponding to Example 5 and Comparative Example 2, respectively.

Figure 3:
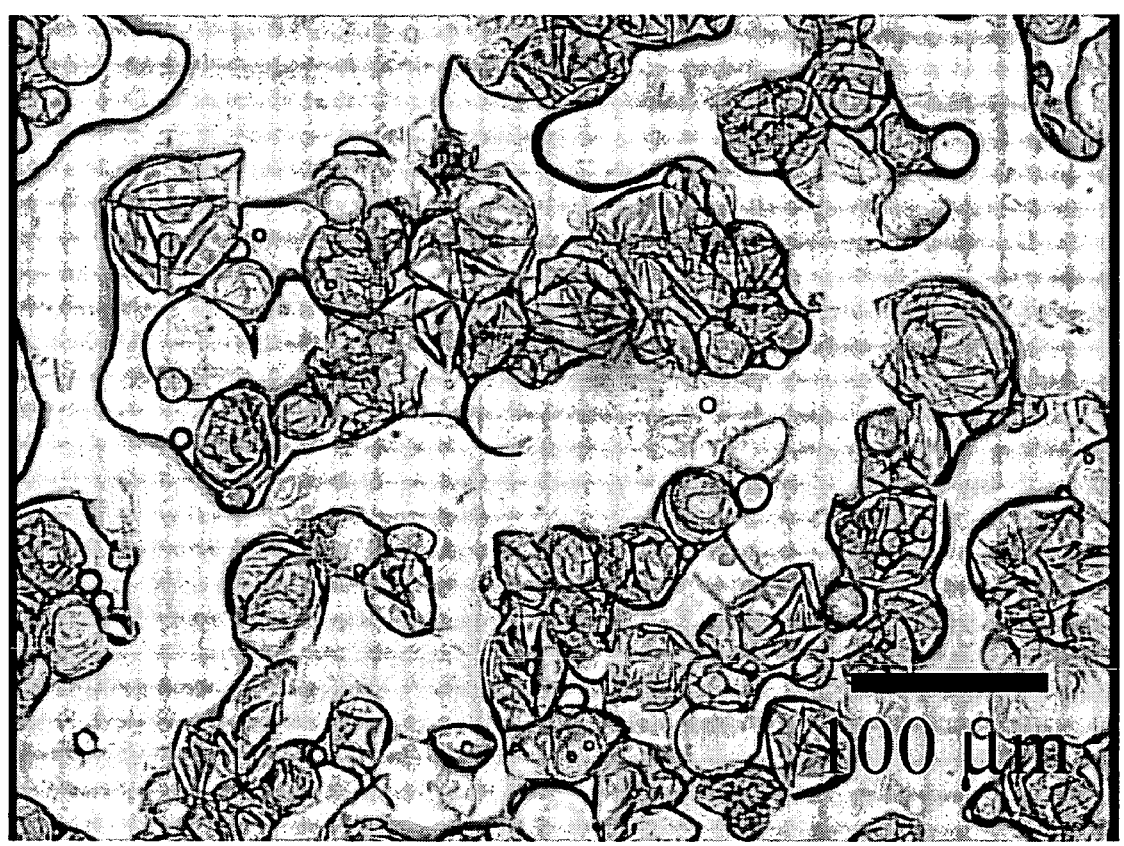
FIG. 3 is an optical microphotograph showing the configuration change by pressurizing the liquid capsule dispersion (without both titanium oxide and a pigment-dispersing agent) obtained in Example 5.
Figure 4:
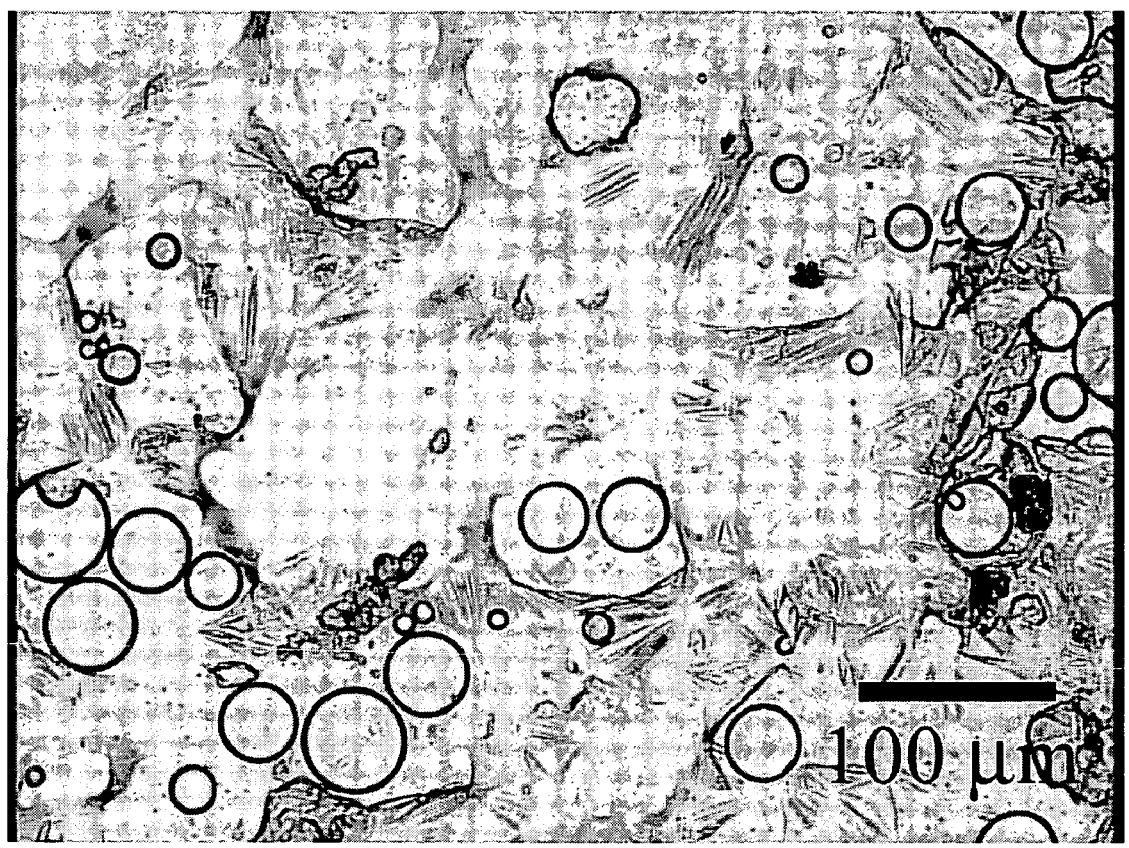
FIG. 4 is an optical microphotograph showing the configuration change by pressurizing the liquid capsule dispersion (without both titanium oxide and a pigment-dispersing agent) obtained in Comparative Example 2.

Then, the cover glass was pressurized, and the configuration change of the microcapsule was observed by an optical microscope. FIG. 3 and FIG. 4 show optical microphotographs corresponding to Example 5 and Comparative Example 2, respectively. In each Example, applying pressure broke the microcapsule, but in the liquid capsule dispersion obtained in Example 5, the broken wall was not fused. On the other hand, in the liquid capsule dispersion obtained in Comparative Example 2, the broken wall was fused, and it was suggested that the crosslinking density of the resin was extremely low.

Incidentally, in the above Examples and Comparative Examples, the properties of microcapsules were evaluated as follows.

[Particle Size Distribution]

One droplet of the liquid dispersion containing the resultant microcapsule was dropped on a slide glass and covered with a cover glass, and was observed by an optical microscope. The observation data was digitized (or computerized) by a CCD camera system connected to the optical microscope. The digitized image data was analyzed by a computer with the use of an image analysis soft ("WinROOF", manufactured by Mitani Corporation) to determine the particle size distribution. Incidentally, regarding the dried fine particle (capsule particle, and powder containing non-capsule fine particle), the particle size distribution can be determined in the same manner as described above by means of observing by a scanning electron microscope and incorporating the observed image data.

[Glass Transition Temperature]

The dried capsule was crushed in a mortar, and the crushed matter was immersed in acetone and stirred to elute the encapsulated colored liquid dispersion. The resultant was centrifuged to discard a supernatant, and another acetone was added to the precipitate for washing. This operation was repeated further twice, and the resultant precipitate was finally dried at a room temperature in a vacuum oven. The glass transition temperature of the dried product was measured with a dynamical scanning calorimeter (DSC 6200, manufactured by Seiko Instruments, Inc.).

[Observation of Liquid Capsule Dispersion]

One droplet of the resultant liquid capsule dispersion was dropped on a slide glass and covered with a cover glass, and was observed by an optical microscope. In addition, the dried fine particle (capsule particle, and powder containing non-capsule fine particle) was observed by a scanning electron microscope. The state of the liquid capsule dispersion was confirmed by these observations.

[Electrophoretic Property]

One electrode was overspread with the capsule particles obtained in Examples 1 and 2 (encapsulating titanium oxide and oil blue), and further covered with a transparent electrode to form a plate. A voltage was applied between the both electrodes, and the color of the plate was changed from white to blue or from blue to white, in response to switching the polarity of the electrode from positive charge to negative charge.

One electrode was overspread with the capsule particles obtained in Examples 3 and 4 (encapsulating carbon black and titanium oxide), and further covered with a transparent electrode to form a plate. A voltage was applied between the both electrodes, and the color of the plate was changed from white to black or from black to white, in response to switching the polarity of the electrode from positive charge to negative charge. This color change is attributable to migration of either particle to the plate surface side (transparent electrode side) in electrophoresis phenomenon because carbon black and titanium oxide were charged negative and positive, respectively.

[Transparency (Clearness)]

Capsule particles were prepared in the same manner as in Examples 5 and 6 except that titanium oxide was not added, respectively, and a transparent glass substrate (thickness: 1 mm) was overspread with each of the capsule particles. The capsule particles was covered with another transparent glass substrate through a spacer which was a 60 μm double-faced (adhesive) tape to produce a plate in which the capsule particles was overspread in almost monolayer. The optical properties of the plate were measured by a hazemeter (NDH 2000, manufactured by Nippon Denshoku Industries Co., Ltd.).

What is claimed is:

1. A microcapsule comprising a disperse system, in which a colored particle is dispersed in an oil phase, and a wall encapsulating the disperse system,
   wherein the wall is formed with an anionic resin having an acid group or a salt thereof having, in the free acid form, an acid value of 20 to 400 mgKOH/g, and
   wherein the resin constituting the wall is crosslinked or cured with the use of the acid group of said anionic resin.

2. A microcapsule according to claim 1, wherein the resin constituting the wall has a self-crosslinkable group, or a crosslinkable group to a reactive group of the resin, or a crosslinking agent.

3. A microcapsule according to claim 1, wherein the disperse system comprises an electrically insulating dielectric fluid, and a single kind or plural kinds of colored particle(s) dispersed in the dielectric fluid.

4. A microcapsule according to claim 1, wherein the colored particle is charged in the oil phase for moving electrophoretically in the microcapsule by a potential difference or an electromotive force.

5. A microcapsule according to claim 1, wherein the mean particle size of the colored particle is 10 to 500 nm, the mean particle size of the microcapsule is 1 to 1000 μm, and the mean thickness of the microcapsule wall is not more than 2 μm.

6. A microcapsule according to claim 1, which is interposed between a pair of electrodes, for displaying art image by electrophoresis of the colored particle.

7. A process for producing a microcapsule which comprises:
   a step for preparing a liquid organic dispersion containing (i.) an anionic resin whose acid value in the free acid form is 20 to 400 mgKOH/g, a part of whose acid groups have been neutralized, (ii.) a colored particle, and (iii.) an organic solvent;
   a step for dispersing the liquid organic dispersion in an aqueous medium to produce a capsule particle in the aqueous medium, the capsule particle comprising a disperse system in which the colored particle is dispersed in the organic solvent, and a wall encapsulating the disperse system; and
   a step for separating the capsule particle from the aqueous medium for dryness to obtain a microcapsule encapsulating the disperse system,
   wherein the process further comprises crosslinking or curing the resin constituting the wall by use of unneutralized acid groups of the anionic resin, after the step of formation of the capsule particle in the aqueous medium, or during the step of separating the capsule particle from the aqueous medium for dryness, or at both of these stages.

8. A process according to claim 7, wherein the liquid organic dispersion is dispersed in the aqueous medium by emulsification or phase inversion emulsification.

9. A process according to claim 7, wherein the liquid organic dispersion is dispersed in the aqueous medium, in which the liquid organic dispersion comprises, as an organic solvent, a hydrophobic organic solvent and a polar solvent dissolving the resin constituting the wall and being miscible to the aqueous medium.

10. A process according to claim 7, which comprises
    a step for neutralizing the acid group of the resin in a polar solvent dissolving the resin constituting the wall and being miscible to the aqueous medium for obtaining a resin solution;
    a step for mixing the resin solution obtained by said neutralization step with a coloring agent to prepare a liquid organic dispersion;
    a step for dispersing the liquid organic dispersion in the aqueous medium to produce an aqueous liquid dispersion containing a capsule particle;
    a step for crosslinking or curing the wall of the capsule particle in the aqueous medium; and
    a step for separating the capsule particle from the aqueous medium for dryness.

11. A process according to claim 7 or 10, wherein the resin constituting the wall of the capsule particle is crosslinked or cured with a crosslinking agent.

12. A process according to claim 7 or 10, wherein the resin constituting the wall is crosslinked or cured with a crosslinking agent, and then the unreacted crosslinking agent is further crosslinked or cured with a polyfunctional compound.

* * * * *

UNITED STATES PATENT AND TRADEMARK OFFICE
CERTIFICATE OF CORRECTION

PATENT NO. : 7,264,875 B2 Page 1 of 1
APPLICATION NO. : 10/800866
DATED : September 4, 2007
INVENTOR(S) : Masaki Hayashi et al.

It is certified that error appears in the above-identified patent and that said Letters Patent is hereby corrected as shown below:

In column 32, line 5 should read as follows:

posed between a pair of electrodes, for displaying an image

Signed and Sealed this

Twenty-seventh Day of May, 2008

JON W. DUDAS
*Director of the United States Patent and Trademark Office*